United States Patent
Zhang et al.

(10) Patent No.: US 8,782,801 B2
(45) Date of Patent: Jul. 15, 2014

(54) SECURING STORED CONTENT FOR TRUSTED HOSTS AND SAFE COMPUTING ENVIRONMENTS

(75) Inventors: Xinwen Zhang, San Jose, CA (US); Onur Aciicmez, San Jose, CA (US); Jean-Pierre Seifert, San Jose, CA (US); Qingwei Ma, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1294 days.

(21) Appl. No.: 11/839,439

(22) Filed: Aug. 15, 2007

(65) Prior Publication Data

US 2009/0049510 A1 Feb. 19, 2009

(51) Int. Cl.
*G06F 17/30* (2006.01)
(52) U.S. Cl.
USPC .............................. 726/27; 713/185
(58) Field of Classification Search
USPC .............. 726/26, 9, 27; 711/2, 164; 713/1, 2; 718/1
See application file for complete search history.

(56) References Cited

U.S. PATENT DOCUMENTS

| | | | | |
|---|---|---|---|---|
| 2006/0107032 A1* | 5/2006 | Paaske et al. | | 713/2 |
| 2007/0261120 A1* | 11/2007 | Arbaugh et al. | | 726/26 |
| 2008/0045342 A1* | 2/2008 | Crowder et al. | | 463/42 |
| 2008/0092235 A1* | 4/2008 | Comlekoglu | | 726/22 |
| 2008/0104348 A1* | 5/2008 | Kabzinski et al. | | 711/164 |
| 2009/0006830 A1* | 1/2009 | Zimmer et al. | | 713/1 |
| 2009/0007104 A1* | 1/2009 | Zimmer et al. | | 718/1 |
| 2009/0013192 A1* | 1/2009 | Chen et al. | | 713/189 |
| 2009/0031408 A1* | 1/2009 | Thom et al. | | 726/9 |
| 2009/0132816 A1* | 5/2009 | Lee | | 713/164 |
| 2009/0327678 A1* | 12/2009 | Dutton et al. | | 713/2 |

OTHER PUBLICATIONS

T. Eisenbarth; Reconfigurable trusted computing in hardware; AMC; pp: 1-6.*
Molina et al., "A Mobile Trusted Platform Module (mTPM) Architecture," Fujitsu Laboratories of America, WATC 2006, 7 pages.
"The Internet Suspend/Resume (ISR) Project," downloaded from http://isr.cmu.edu, 1 page.
"Turbolinux to Launch wispy Worldwide New!" News Release, May 31, 2007, http://www.turbolinux.com, 2 pages.

(Continued)

*Primary Examiner* — Mohammad W Reza
*Assistant Examiner* — Monjour Rahim
(74) *Attorney, Agent, or Firm* — Kenneth L. Sherman, Esq.; Michael Zarrabian, Esq.; Sherman & Zarrabian LLP

(57) ABSTRACT

Techniques for protecting content to ensure its use in a trusted environment are disclosed. A trusted security component provided for a device can verify the internal integrity of the stored content and the host before it allows the content to come in contact with the host. As a counter part, a trusted security component provided for the host can verify and attest to the integrity of the host and/or specific host computing environment that can be provided for the content stored in the device. The trusted security component provided for a device effectively verify the host integrity based on the information attested to by the trusted security component provided for the host. If the trusted security component trusts the host, it allows the trusted host to provide a trusted host computing environment trusted to be safe for the content stored in the device.

49 Claims, 8 Drawing Sheets

(56) References Cited

OTHER PUBLICATIONS

"Turbolinux provides the totally new linux desktop style with the new device wispy," Newsrelease, Dec. 19, 2006, http://www.turbolinux.com, 2 pages.

"USB flash drive," Wikipedia, the free encyclopedia, http://en.wikipedia.org/wiki/Usb_flash_drive, 10 pages.

"Trusted Computing," Wikipedia, the free encyclopedia, http://en.wikipedia.org/wiki/Trusted_computing#Remote_attestation, 11 pages.

"Trusted Platform Module," Wikipedia, the free encyclopedia, http://en.wikipedia.org/wiki/Trusted_platform_module, 3 pages.

"Full virtualization," Wikipedia, the free encyclopedia, http://en.wikipedia.org/wiki/Full_virtualization, 2 pages.

"Cryptography," Wikipedia, the free encyclopedia, http://en.wikipedia.org/wiki/Cryptography, 15 pages.

"Dynamic-link library," Wikipedia, the free encyclopedia, http://en.wikipedia.org/wiki/Dynamic-link_library, 6 pages.

"Virtual machine," Wikipedia, the free encyclopedia, http://en.wikipedia.org/wiki/Virtual_machine, 7 pages.

"BIOS," Wikipedia, the free encyclopedia, http://en.wikipedia.org/wikki/BIOS, 6 pages.

"Hypervisor," Wikipedia, the free encyclopedia, http://en.wikipedia.org/wiki/Virtual_machine monitor, 4 pages.

"U3," Wikipedia, the free encyclopedia, http://en.wikipedia.org/wiki/U3_smart_drive, 6 pages.

Caceres et al. "SoulPad," downloaded from http://www.research.ibm.com/WearableComputing/SoulPad/soulpad.htm, 3 pages.

Garriss et al. "IBM Research Report-Trustworthy Personalized Computing on Public Kiosks," Computer Science, RC24169 (W0702-003) Feb. 2, 2007, 19 pages.

* cited by examiner

SECURING STORED CONTENT FOR TRUSTED HOSTS AND SAFE COMPUTING ENVIRONMENTS

BACKGROUND OF THE INVENTION

Generally, a computing device (e.g., a computer) can be conceptually reduced to a device that can accept content (or information) typically as data in a digital or binary form and manipulate it to obtain or determine a result based on a sequence of instructions (or computer program) that effectively describes how to process the data. More complex computers can store content including the computer program. A computer program may be invariable and/or built into the computer device as logic circuitry provided, for example, on microprocessors or computer chips. Today, general purpose computers can have both kinds of programming. Given the prevalence of computing devices in modern society, computer storage or computer memory used to store content, is often casually referred to as "memory." Storing content (or information retention) is of one the core functions of computing devices. As such, memory is one of the fundamental components of all modern computers and is often coupled with a Central Processing Unit (CPU) to implement the basic Von Neumann computer model which has been used since the 1940s.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in automobiles and household electronic appliances.

In recent years, portability and mobility of computing systems have improved. Today, various mobile and handheld computing devices including wireless phones, media players, Personal Digital Assistants (PDA's) are widely available. Generally, a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface. Along with mobile computing devices (e.g., laptops, smartphones), PDAs and media players are becoming increasingly popular.

As suggested above, memory and memory devices have long been an important part of computing and computing devices. Memory technology has also markedly improved in recent years. Today, relatively large amount of content can be stored n a portable and easy to access devices such as USB flash drives (or USB flash devices). The content stored on USB flash drive can be easily carried and copied on various computing devices. By way of example, data stored on server computer can be copied on a USB flash drive and taken home and loaded (or copied) on a Personal Computer (PC) and used. The data can be modified on the PC and stored back on the USB flash drive. The USB flash drive can be taken back to work to be used by a computer provided at work or carried to a different city and used by another computer or laptop. The USB flash drive is especially popular today and represents an exemplary advancement in storage technology which has effectively improved portability and mobility of computing systems. As such, USB flash drives will be discussed below.

USB flash drives are generally NAND-type flash memory data storage devices integrated with a USB (universal serial bus) interface. NAND flash architecture was introduced by Toshiba in 1989. NAND flash memories are typically accessed much like block devices such as hard disks or memory cards. The pages are typically 512 or 2,048 bytes in size. Associated with each page are a few bytes (typically 12-16 bytes) that should be used for storage of an error detection and correction checksum. USB flash drives are typically small, lightweight, removable and rewritable. Memory capacities for USB flash Drives currently can range from 32 megabytes up to 64 gigabytes. Capacity is limited only by current flash memory densities, although cost per megabyte may increase rapidly at higher capacities due to the expensive components. USB flash drives offer potential advantages over other portable storage devices, particularly the floppy disk. They are more compact, generally faster, hold more data, and are more reliable (due to both their lack of moving parts, and their more durable design) than floppy disks. These types of drives use the USB mass storage standard, supported natively by modern operating systems such as Windows, Mac OS X, Linux, and Unix.

Generally, a flash drive has a small printed circuit board typically in a plastic or metal casing, making the drive sturdy enough to be carried about in a pocket, as a key fob, or on a lanyard. The USB connector protrudes from the casing, and is usually covered by a removable cap. Most flash drives use a standard type-A USB connection allowing them to be connected directly to a port on a personal computer.

To access the data stored in a flash drive, the drive is typically connected to a computer, either by plugging it into a USB host controller built into the computer, or into a USB hub. Typically, flash drives are active only when plugged into a USB connection and draw all necessary power from the supply provided by that connection. However, some flash drives, especially high-speed drives, may require more power than the limited amount provided by a bus-powered USB hub, such as those built into some computer keyboards or monitors. These drives will not work unless plugged directly into a host controller (i.e., the ports found on the computer itself) or a self-powered hub.

The advancement in memory devices and mobile computing is generally appreciated by those skilled in the art as well as the general public. However, computer security remains as a major concern. Accordingly, techniques for improving the security for computing systems are needed.

SUMMARY OF THE INVENTION

Broadly speaking, the invention relates to improved techniques for protecting content stored on a computer readable medium.

One aspect of the invention provides techniques for securing content stored in a computer readable medium (e.g., memory) in order to, among other things, protect against harmful and/or defective host (or hosted) computing environments that can be provided by various computing systems that can effectively be used to access the content. Stored content can, for example, be computing components including data and executable computer program code (e.g., data, an application program, an operating system, and a compiler) that effectively make up a computing environment. A computing system (e.g., personal computer, laptop, server) can effectively act as a host by providing a host computing environment that offers various computing services including storing application programs (or applications) and processing (or executing) them using its computing resources (e.g., memory, processor, operating system). Another aspect of the invention provides techniques for providing trusted computing environments that can effectively serve as an environment trusted to a safe for the stored content. Yet another aspect of the invention provides one or more host virtual computing environments that allow one or more computing environments stored on one or more external devices to securely execute. It will be appreciated that the one or more computing environments executed in a virtual host environment can, for example, represent a complete image (or copy) of content including application programs and operating systems of an external computing system or device.

In accordance with one aspect of the invention, content stored in computer readable medium (e.g., memory) is effectively secured by requiring a host computing system to attest to its integrity as a trusted (safe or secure) entity trusted to provide a safe or secure computing environment for the stored content before allowing the computing system to provide a host computing environment for the stored content. In other words, the computing system it required to attest to its integrity before effectively providing the stored content to the host computing system or allowing the host computing system to access the stored content. It will be appreciated that a host computing system can, for example, be required to generally attest to its integrity as a trusted entity or trusted host and/or more specifically attest to the integrity of the particular computing environment and/or its components. Those skilled in the art will appreciate that a host computing device can attest, for example, in compliance with the standards set forth by the Trusted Computing Group (TCG) community where a trusted-platform device can attest to its state (or report its integrity state), for example, by reporting the values if the registers provided in a Trusted Platform Module (TPM) chip. More generally, a host computing system can be required to successfully report its integrity state to a trusted security system (or mechanism) provided for an external device in order to secure content stored in the device in accordance with one aspect of the invention. In other words, the trusted security system has to verify the integrity state of the host and/or host computing system before the host or its services are effectively engaged. It should be noted that the internal integrity of the device including the content stored on the device can also be verified before a host and/or host services are effectively engaged (e.g., integrity of content and mechanisms that interface with the host computing system and/or facilitate use of the host computing environment can be verified before engaging a host and/or allowing the content to come in contact with the host).

In one embodiment, a secure (or secured) memory device (e.g., a secure USB flash drive) is provided. A trusted security system effectively provided for the memory device effectively protects the content stored in the memory device from host computing systems not trusted to provide a safe computing environment for the content. The trusted security system can includes Trusted Platform Module (TPM) component and a loading/verification component. It will be appreciated that the Trusted Platform Module (TPM) component can verify the internal integrity of the memory device before engaging the host computing system and/or before allowing the stored content to come in contact with a host computing system. As such, the Trusted Platform Module (TPM) component can, for example, effectively determine whether the operating components of the memory device are corrupted and/or the stored content is defective. More particularly, the Trusted Platform Module (TPM) component can verify the integrity of various computing components (e.g., application programs, operating systems, and data) stored in the memory, as well as the loading/verification component before it initiates or allows the loading/verification component to be initiated. If the Trusted Platform Module (TPM) component cannot verify the internal integrity of the memory device it can effectively render it inoperable so that its content cannot be loaded into the host computing system. However, if the Trusted Platform Module (TPM) component successfully verifies the internal integrity of the memory device, it initiates the verification/loading component. The verification/loading component can effectively ensure that the host computing environment is safe. More particularly, the loading/verification component can issue an attestation challenge to the host computing system and subsequently determine whether to consider the host computing system as a trusted host trusted to provide a safe host (or hosted) computing environment for the stored content. The loading/verification component can, for example, compare host integrity value(s) attested by the host to known host integrity value(s) indicative of a trusted host. If the loading/verification cannot verify that integrity of the host, it can effectively render the memory device inoperable. However, if the loading/verification component determines that the host has successfully attested to its integrity, the loading/verification component can facilitate use of the host (or hosted) computing environment provided by the host computing system. By way of example, the loading/verification component can load the content into a trusted host computing environment provided by the host computing system trusted to provide a safe computing environment for the content.

A trusted (safe or secure) computing environment can be provided in accordance with another aspect of the invention. More particularly, a trusted host security system can be provided for a host computing system to ensure that the host computing system provides a trusted host computing environment for content stored on another device. Typically, the device that stores the content is an external device and/or a device that is separable from the host computing system, but can store the content independently. Generally, the host trusted security system can verify the internal integrity of the computing system before it allows the computing system to engage other devices as a host. If the internal integrity of the host computing system is verified, the host trusted security system can effectively attest to the integrity of the host computing system and/or the host computing environment it can provide. It will be appreciated that a host trusted security system can attest to the integrity of the host computing system when a secure external device (e.g., a secure USB flash drive) issues an attestation challenge using a device trusted security system provided in accordance with the invention. By way of example, when a secure USB flash drive is connected to a Personal Computer (PC), the trusted security component of the secure USB flash drive can issue an attestation challenge to the PC acting as a host computing system in this situation. A host trusted security component (or system) of the PC can effectively verify the internal integrity of the PC and attest to its integrity after it verifies the integrity of the PC. It should be noted a device trusted security component (or system) provided for the secure USB flash drive can also verify the integrity the secured USB flash drive before the content is loaded on the PC. In this way, the two trusted security components can effectively work together to protect the USB flash drive and PC. The trusted security components can interact in order to establish that the PC is a trusted by the USB flash drive as trusted PC trusted to provide a safe environment for loading and execution of data, application programs and operating systems stored on the USB flash drive as trusted PC.

Yet another aspect of the invention provides one or more secure virtual host environments for hosting computing environments stored as content on one or more external devices. It will be appreciated virtual host environments can be effectively isolated from each other and/or the operating components of the host computing system. In one embodiment, a Virtual Machine Monitor (VMM) effectively monitors one or more host virtual machines provided for execution of the content loaded from external devices. A host virtual machine can allow an image (or copy) of content including application programs and operating systems to be executed on the host computing system. As a result, an image of a computing environment operating on one computing system can be effectively supported by the host computing system in a virtual computing environment. By way of example, the applications, data and operating systems used on a first PC can be copied and stored on a secure USB flash drive that is subsequently plugged into a trusted host computer. The trusted host computer provides a virtual environment for execution of the applications using the same operating systems operating on the first PC. As a result, a computing environment that appears to be the same as the one provided on the first PC can be provided by the trusted host computer. In addition, the content is effectively protected as the host computer can isolate it from other virtual environments and/or its operating components.

The invention can be implemented in numerous ways, including, for example, a method, an apparatus, a computer readable medium, and a computing device. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
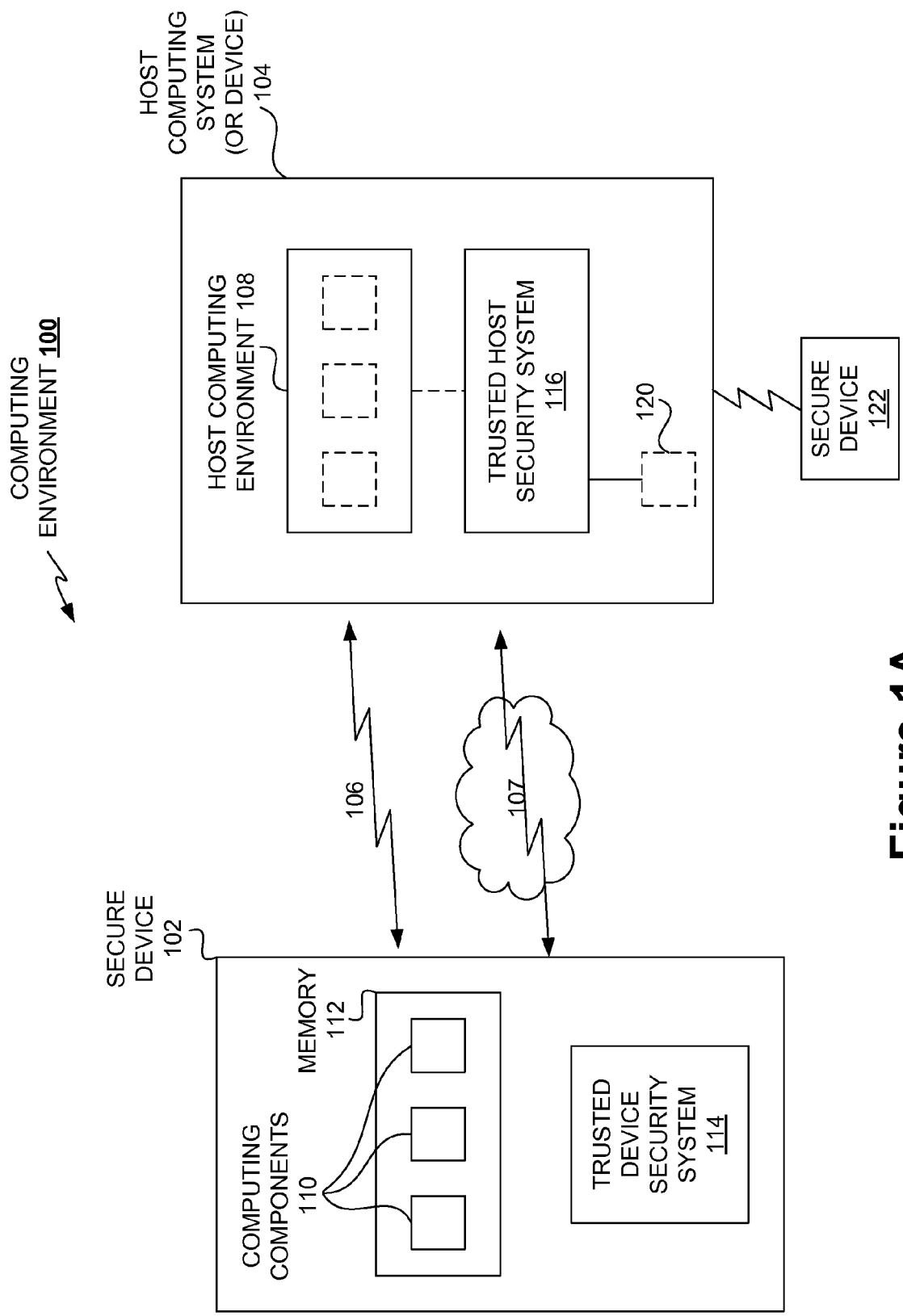
FIG. 1A depicts a computing environment in accordance with one embodiment of the invention.

As noted in the background section, portability and mobility of computing systems has improved in recent years. In addition, advancement in memory technology and memory devices has further facilitated the use of modern and mobile computing system and environments where content can be stored and easily carried and used on various computing devices. However, computer security is a general concern for modern computing systems and environments. Security is especially problematic for portable and mobile communication systems, in particular when multiple computing systems effectively access and process content (or information). By way of example, a conventional USB flash drive allows content on one computer to be easily copied, carried and used on various other computers.

The content stored on some USB flash drive can be locked using a password in order to prevent unauthorized access. However, this does not protect the content stored on the USB flash drive from the computers that access the content. In other words, the computing systems that are used to access content stored on a memory device can comprise security and/or privacy. For example, when a USB flash drive is connected to a computer, the data and applications stored on the USB flash drive can be attacked by malicious software such as viruses, spyware, Trojan horses, etc. Accordingly, improved techniques for protecting and using stored content are needed.

Generally speaking, the invention pertains to techniques for securing stored content (or information) and ensuring that the content is used in a safe computing environment. One aspect of the invention provides techniques for securing content stored in a computer readable medium (e.g., memory) in order to, among other things, protect against harmful and/or defective host (or hosted) computing environments that can be provided by various computing systems that can effectively be used to access the content. Stored content can, for example, be computing components including data and executable computer program code (e.g., data, an application program, an operating system, and a compiler) that effectively make up a computing environment. A computing system (e.g., personal computer, laptop, server) can effectively act as a host by providing a host computing environment that offers various computing services including storing application programs (or applications) and processing (or executing) them using its computing resources (e.g., memory, processor, operating system). Another aspect of the invention provides techniques for providing trusted computing environments that can effectively serve as an environment trusted to a safe for the stored content. Yet another aspect of the invention provides one or more host virtual computing environments that allow one or more computing environments stored on one or more external devices to securely execute. It will be appreciated that the one or more computing environments executed in a virtual host environment can, for example, represent a complete image (or copy) of content including application programs and operating systems of an external computing system or device.

In accordance with one aspect of the invention, content stored in computer readable medium (e.g., memory) is effectively secured by requiring a host computing system to attest to its integrity as a trusted (safe or secure) entity trusted to provide a safe or secure computing environment for the stored content before allowing the computing system to provide a host computing environment for the stored content. In other words, the computing system it required to attest to its integrity before effectively providing the stored content to the host computing system or allowing the host computing system to access the stored content. It will be appreciated that a host computing system can, for example, be required to generally attest to its integrity as a trusted entity or trusted host and/or more specifically attest to the integrity of the particular computing environment and/or its components. Those skilled in the art will appreciate that a host computing device can attest, for example, in compliance with the standards set forth by the Trusted Computing Group (TCG) community where a trusted-platform device can attest to its state (or report its integrity state), for example, by reporting the values if the registers provided in a Trusted Platform Module (TPM) chip. More generally, a host computing system can be required to successfully report its integrity state to a trusted security system (or mechanism) provided for an external device in order to secure content stored in the device in accordance with one aspect of the invention. In other words, the trusted security system has to verify the integrity state of the host and/or host computing system before the host or its services are effectively engaged. It should be noted that the internal integrity of the device including the content stored on the device can also be verified before a host and/or host services are effectively engaged (e.g., integrity of content and mechanisms that interface with the host computing system and/or facilitate use of the host computing environment can be verified before engaging a host and/or allowing the content to come in contact with the host).

In one embodiment, a secure (or secured) memory device (e.g., a secure USB flash drive) is provided. A trusted security system effectively provided for the memory device effectively protects the content stored in the memory device from host computing systems not trusted to provide a safe computing environment for the content. The trusted security system can includes Trusted Platform Module (TPM) component and a loading/verification component. It will be appreciated that the Trusted Platform Module (TPM) component can verify the internal integrity of the memory device before engaging the host computing system and/or before allowing the stored content to come in contact with a host computing system. As such, the Trusted Platform Module (TPM) component can, for example, effectively determine whether the operating components of the memory device are corrupted and/or the stored content is defective. More particularly, the Trusted Platform Module (TPM) component can verify the integrity of various computing components (e.g., application programs, operating systems, and data) stored in the memory, as well as the loading/verification component before it initiates or allows the loading/verification component to be initiated. If the Trusted Platform Module (TPM) component cannot verify the internal integrity of the memory device it can effectively render it inoperable so that its content cannot be loaded into the host computing system. However, if the Trusted Platform Module (TPM) component successfully verifies the internal integrity of the memory device, it initiates the verification/loading component. The verification/loading component can effectively ensure that the host computing environment is safe. More particularly, the loading/verification component can issue an attestation challenge to the host computing system and subsequently determine whether to consider the host computing system as a trusted host trusted to provide a safe host (or hosted) computing environment for the stored content. The loading/verification component can, for example, compare host integrity value(s) attested by the host to known host integrity value(s) indicative of a trusted host. If the loading/verification cannot verify that integrity of the host, it can effectively render the memory device inoperable. However, if the loading/verification component determines that the host has successfully attested to its integrity, the loading/verification component can facilitate use of the host (or hosted) computing environment provided by the host computing system. By way of example, the loading/verification component can load the content into a trusted host computing environment provided by the host computing system trusted to provide a safe computing environment for the content.

A trusted (safe or secure) computing environment can be provided in accordance with another aspect of the invention. More particularly, a trusted host security system can be provided for a host computing system to ensure that the host computing system provides a trusted host computing environment for content stored on another device. Typically, the device that stores the content is an external device and/or a device that is separable from the host computing system, but can store the content independently. Generally, the host trusted security system can verify the internal integrity of the computing system before it allows the computing system to engage other devices as a host. If the internal integrity of the host computing system is verified, the host trusted security system can effectively attest to the integrity of the host computing system and/or the host computing environment it can provide. It will be appreciated that a host trusted security system can attest to the integrity of the host computing system when a secure external device (e.g., a secure USB flash drive) issues an attestation challenge using a device trusted security system provided in accordance with the invention. By way of example, when a secure USB flash drive is connected to a Personal Computer (PC), the trusted security component of the secure USB flash drive can issue an attestation challenge to the PC acting as a host computing system in this situation. A host trusted security component (or system) of the PC can effectively verify the internal integrity of the PC and attest to its integrity after it verifies the integrity of the PC. It should be noted a device trusted security component (or system) provided for the secure USB flash drive can also verify the integrity the secured USB flash drive before the content is loaded on the PC. In this way, the two trusted security components can effectively work together to protect the USB flash drive and PC. The trusted security components can interact in order to establish that the PC is a trusted by the USB flash drive as trusted PC trusted to provide a safe environment for loading and execution of data, application programs and operating systems stored on the USB flash drive as trusted PC.

Yet another aspect of the invention provides one or more secure virtual host environments for hosting computing environments stored as content on one or more external devices. It will be appreciated virtual host environments can be effectively isolated from each other and/or the operating components of the host computing system. In one embodiment, a Virtual Machine Monitor (VMM) effectively monitors one or more host virtual machines provided for execution of the content loaded from external devices. A host virtual machine can allow an image (or copy) of content including application programs and operating systems to be executed on the host computing system. As a result, an image of a computing environment operating on one computing system can be effectively supported by the host computing system in a virtual computing environment. By way of example, the applications, data and operating systems used on a first PC can be copied and stored on a secure USB flash drive that is subsequently plugged into a trusted host computer. The trusted host computer provides a virtual environment for execution of the applications using the same operating systems operating on the first PC. As a result, a computing environment that appears to be the same as the one provided on the first PC can be provided by the trusted host computer. In addition, the content is effectively protected as the host computer can isolate it from other virtual environments and/or its operating components.

Embodiments of these aspects of the invention are discussed below with reference to FIGS. 1A-3. However, those skilled in the art will readily appreciate that the detailed description given herein with respect to these figures is for explanatory purposes as the invention extends beyond these limited embodiments.

FIG. 1A depicts a computing environment 100 in accordance with one embodiment of the invention. It will be appreciated that the computing environment 100 provides a secure device 102 that can protect stored content from harmful hosts and host computing environment. The secure device 102 allows the content to use a safe computing environment provided by a host computing system (or device) 104 which is also provided by the computing environment 100.

Referring to FIG. 1A, the secure device 102 can be operatively connected to and/or in communication with the host computing system 104 in order to effectively use the host computing environment 108. A connection can, for example, be made via a direct wired and/or wireless connection 106 or via a network 107. The secure device 102 can store content including one or more computing components (e.g., data, an executable computer program, an operating system, an application program, computer program source, files, text files, audio files, video files, and audio-visual files) 110 in memory 112. Moreover, the secure device 102 can ensure that the computing component(s) 110 are used in a trusted (secure or safe) host computing environment 108 provided by the host computing system 104. In other words, the secure device 102 can ensure that the host computing system 104 is a trusted host that can provide a secure or safe host (or hosted) environment 108 the content store in memory 110 including the one or more computing components 110 depicted in FIG. 1A. The memory 112 can, for example, be non-volatile memory (e.g., flash memory). In general, the computing components 110 can be content stored in computer readable form (e.g., binary format). As such, the computing components 110 can, for example, include data, executable computer program code, an operating system, an application program, computer program source, files/text files, audio files, video files, audio-video files, etc.

In order to ensure that the host computing system 104 is a trusted host that can provide a safe and/or secured host computing environment 108 for use by the computing components 110 stored in the memory 112 of the secured device 102, a trusted device security system 114 is effectively provided for the secure device 102. It will be appreciated that the trusted device security system 114 can effectively require the host computing system 104 to attest to its integrity and/or the integrity of the host computing environment 108 before allowing any one of the computing components 110 to be loaded onto the host computing system 104. More generally, the trusted device security system 114 can effectively refuse the services offered by the computing system 104 if the host computing system 104 cannot successfully attest to its integrity. The attestation process is described in greater detail below. However, it should also be noted that the trusted device security system 114 can also perform an internal integrity check of the secure device 102. More particularly, the trusted device security system 114 can verify the internal integrity of the computing components 110 as well as other operational components provided for the trusted device security system 114 as will be described below.

It will also be appreciated that a trusted host security system 116 provided for the host computing system 104 can effectively ensure that a safe host computing environment 108 is provided for use by the computing components 110 stored in the secure device 102. As will be described in great detail below, the trusted host security system 116 can verify its own internal integrity before engaging the secure device 102. More particularly, the trusted host security system 116 can verify the integrity of the operating components that effectively support the host computing environment 108. In addition, the trusted host security system 116 can effectively attest to the integrity of the host computing system 104 and/or host computing environment 108 in response to an attestation challenge made by the trusted device security system 114 of the secure device 102. In effect, the combination of the trusted device and host security systems 114 and 116 ensure that the host computing environment 108 is a secure environment so that it can safely be used by the computing components 110 stored on the secure device 102 and host computing system 104 are depicted in greater detail respectively in FIGS. 2A and 2B in accordance with the embodiments of the invention.

The computing environment 108 can, for example, provide computing resources that are not provided by the secure device 102. As such, the secure device 102 can, for example, be a device primarily used for storing content (e.g., a memory device) which may be connected (or plugged into) the host computing system 104. However, it will be appreciated that the secure device 102 can be any computing device that can store content regardless of whether it can effectively provide a computing environment for use of the content. As such, the trusted device security system 114 can be provided for a wide variety of devices including, for example, wireless phones, Personal Digital Assistants, Personal Computers, and Laptops. It should also be noted that the host computing system 104 can be configured and/or operable to provide a second computing environment 120 for a second secured device 122 in a similar manner as described above. Services offered by the host computing system 104 can, for example, include processing services for executing one or more computer program, storage services for storing said one or more computing components, application program and/or library services for use in connection with said one and or more components.

Figure 1B:
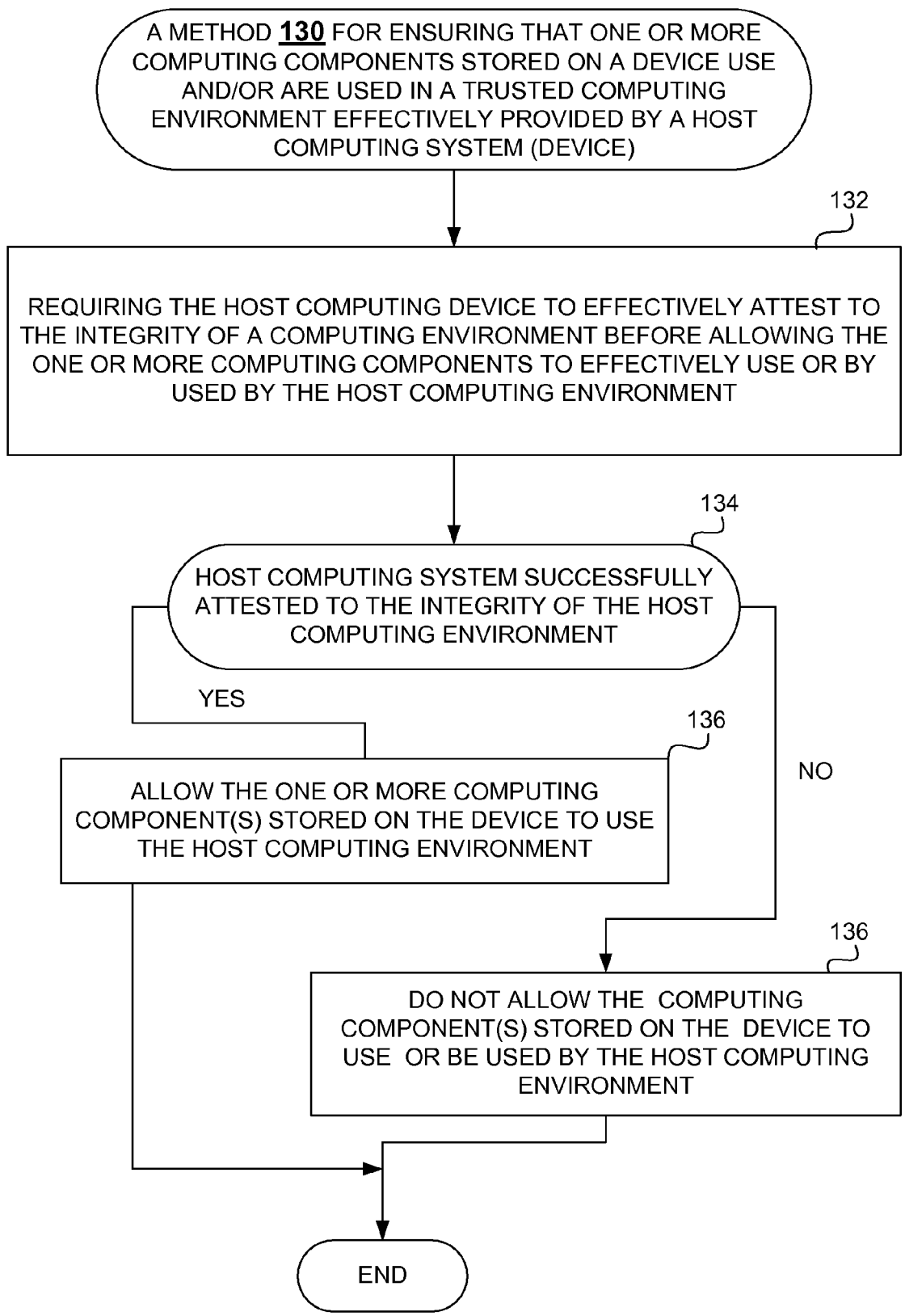
FIG. 1B depicts a method for ensuring that one or more computing components stored on a device are used in a safe computing environment in accordance with one embodiment of the invention.

FIG. 1B depicts a method 130 for ensuring that one or more computing components stored on a device use and/or are used in a trusted host computing environment in accordance with one embodiment of the invention. Typically, the host computing environment is effectively provided by a host computing system (or device). The method 130 can, for example, be used by the secure device 102 depicted in FIG. 1A.

Referring now to FIG. 1B, initially, it is required (or requested) (132) that the host computing system attest to the integrity of the host computing environment that it can provide for use by one or more computing components stored on the device. It should be noted that the host computing device can, for example, be required to attest to its integrity (or general integrity) as a trusted device (or trusted entity). In other words, the host computing system may be required to prove that it is a trusted entity, for example, by reporting its integrity status or value. However, depending on the desired implementation, the host computing system can be required to attest to the integrity of the specific host computing environment that it can provide and/or the various components that support the host computing environment.

In any case, the host computing system is required (132) to effectively attest to the integrity (safety or security) of the host computing environment. By way of example, a device or entity that requests (or issues) the attestation request (or challenge) can be configured to determine whether the attestation (or attestation challenge) is successful. Accordingly, it can be determined (134) whether the host computing system has successfully attested to the integrity of the host computing environment. If it is determined (134) that the host computing system has successfully attested to the integrity of the host computing environment, one or more computing components are allowed (136) to use and/or be used by the host computing environment. The method 130 ends after allowing (136) the one or more computing components to use and/or be used in the host computing environment. It should be noted that if it is determined (134) that host computing system has not successfully attested to the integrity of the host computing environment, the one or more computing components are not allowed (136) to use or be used by the host computing environment and the method 130 ends. More generally, the computing services of the host can be refused if is determined (134) that host computing device has not successfully attested to the integrity of the host computing environment. On the other hand, the computing services of the host are accepted if it is determined (134) that host computing device has successfully attested to the integrity of the host computing environment. Typically, the host computing system can offer a variety of computing services, including providing a host computing environment for execution of computer program code stored on an external device, providing application programs and/or libraries, memory for storage, and so on.

Figure 1C:
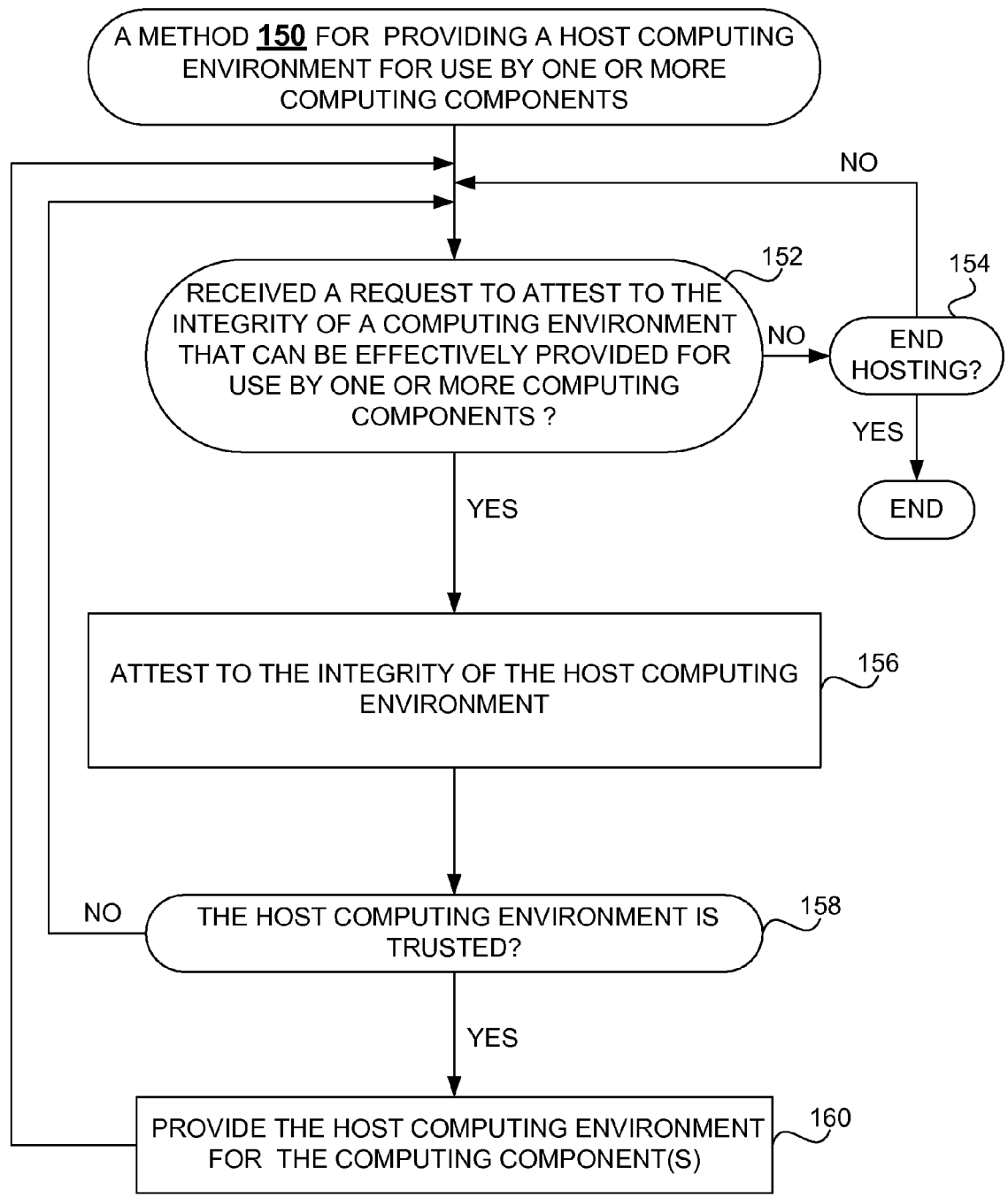
FIG. 1C depicts a method for providing a computing environment for use by one or more computing components in accordance with one embodiment of the invention.

FIG. 1C depicts a method 150 for providing a host computing environment for one or more computing components in accordance with one embodiment of the invention. Typically, the one or more computing components are stored on an external device (e.g., the secured device 102 depicted in FIG. 1A) that can independently store the component(s). The method 150 can, for example, be used by a host computing system 104 depicted in FIG. 1A.

Referring to FIG. 1C, initially, it is determined (152) whether a request to attest to the integrity of the host computing environment (attestation request) is received (152). It will be appreciated that the attestation request can, for example, be directed to the general integrity of a host computing system, the host computing environment and/or its components. Typically, the attestation request is initiated by a device that seeks to use the computing environments for one or more computing components that the device stores. However, it will be appreciated that the attestation request can also be made by one entity on behalf of another entity and/or on behalf of computing components stored by the other entity. In general, the attestation request can be submitted by and/or on behalf of an entity that seeks to access the host computing environment.

In effect, the method 150 can wait to receive a attestation request or terminate if it is determined (154) to end the hosting services. The hosting services, can, for example, end when the host computing system (or device) effectively shuts down and/or input provided by an administrator indicates to end the hosting operations. If it is determined (152) that an attestation request is received, the integrity of the computing environment is attested to (156). It should be noted that a host computing system (or device) that effectively provides the host computing environment can, for example, effectively attest to its integrity as a trusted host, attest to the integrity of the host computing environment, attest to integrity of its components and/or components that support the host computing environment. In any case, the attestation allows a requesting entity and/or its agents to determine whether to trust the host computing system as a safe (or secure) computing environment. By way of example, a device can determine based on the attested information received from the host computing system whether the host computing system can be trusted to provide a safe and/or secure computing environment. The device can also effectively indicate that it trusts the host computing system and/or the specific host computing environment provided by it. In general, it can be determined (158) whether the host computing environment is trusted. If it is determined (158) that the host computing environment is not trusted, the method 150 can proceed to determine (152) whether another attestation request has been received. However, if it is determined (158) that the host computing environment is trusted, the host computing environment is effectively provided for the one or more computing components before determining (152) whether another attestation request is received (152). Those skilled in the art will readily appreciate that multiple attestation requests can be effectively processed in parallel even though for simplicity FIG. 1C depicts processing of one attestation request. The method 150 ends when it is determined (154) to end the hosting operations.

Figure 2A:
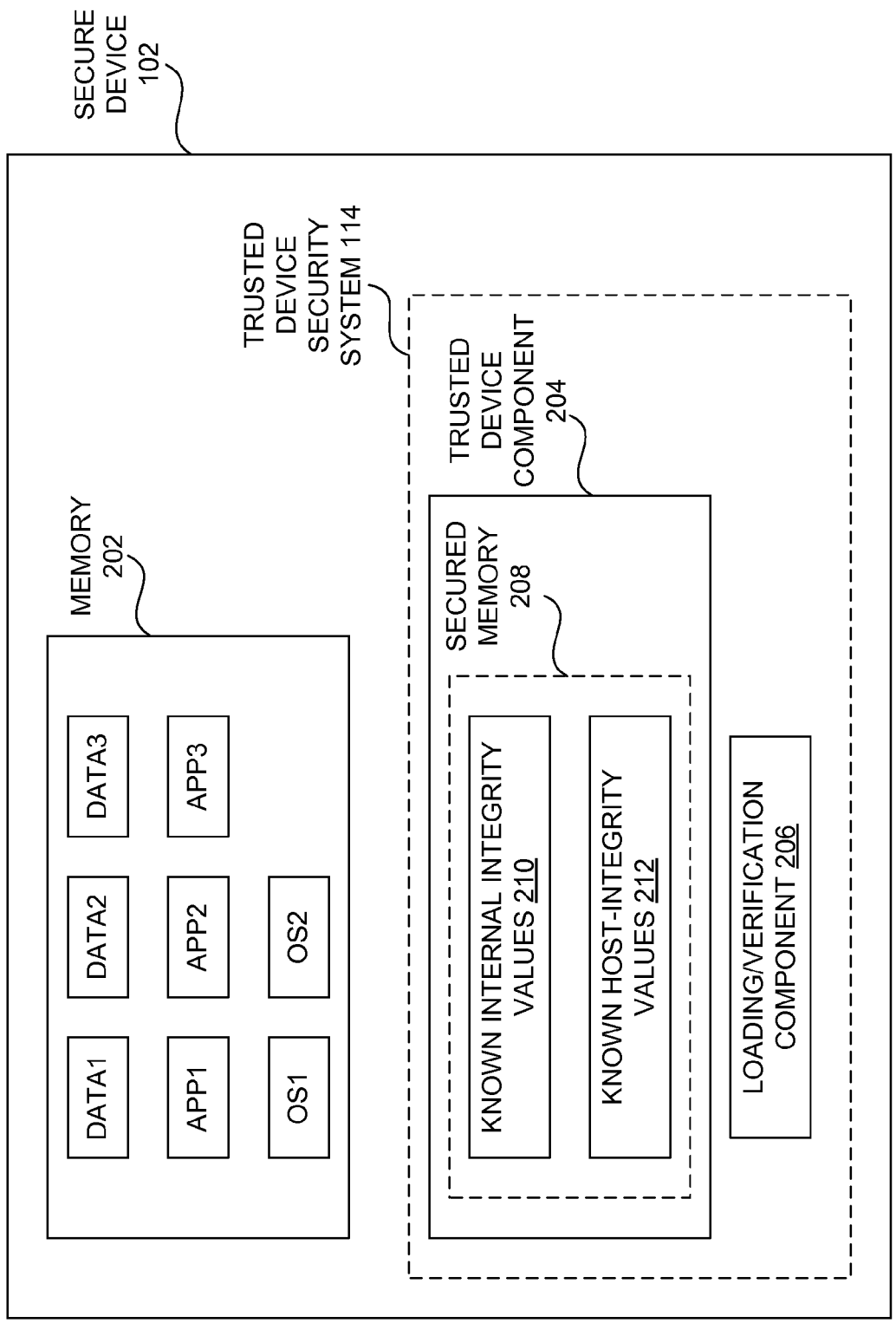
FIG. 2A depicts in greater detail the secured device in accordance with one embodiment of the invention.

FIG. 2A depicts in greater detail the secure (or secured) device 102 (also shown in FIG. 1A) in accordance with one embodiment of the invention. The secure device 102 is effectively secured by a trusted security system 114. Referring to FIG. 2A, memory 202 stores various exemplary computing components including operating systems (OS1 and OS2), application programs (APP1, APP2 and APP3), and data (data1, data2 and data3). The memory 202 can, for example, be non-volatile memory. (e.g., flash memory on a memory device). As shown in FIG. 2A, the trusted device security system 114 can conceptually include a trusted device component 204 and a loading/verification component 206. It will be appreciated by those skilled in the art that the trusted device component 204 can, for example, be provided as a Trusted Platform Module (TPM) component in accordance with the guidelines set forth by the TPM Community. Generally, the trusted device component 204 can be implemented in hardware and/or software. Today, TPM modules are often implemented as a hardware component (e.g., a chip). In any case, the trusted device component 204 is effectively trusted with the responsibility of verifying that the computing components stored in memory 202 and the loading/verification component 206 have maintained their integrity before it initiates the loading/verification component which can, in turn, effectively determine whether to trust a host computing environment as a trusted computing environment when a host computing system is engaged for its hosting services.

Prior to initiating the loading/verification component 206, the trusted device component 204 can effectively verify the internal integrity of the secure device 102. To this end, the trusted device component 204 can effectively check the internal integrity of the computing components stored in memory 202 and the loading verification component 206. It will be readily appreciated that these components can, for example, be checked when the secure device 102 is initially booted, started up, periodically and/or prior to allowing the computing components stored in memory 202 to use or be used by a host computing environment provided by a host computing device. As such, the trusted device component 204 can, for example, be implemented to be the first component that starts when the secure device 102 is initially started (e.g., trusted device component 204 can be the first component initiated when power is supplied to the secure device 102 so that it can effectively control the booting process).

In order to ensure that the computing components stored on memory 202 have maintained their integrity, the trusted device component 204 can effectively use one or more known internal-integrity values 210 which are stored in the secured memory 208. As shown in FIG. 2A, the secured memory 208 can be effectively implemented as a part of the trusted device component 204. However, it will be appreciated that the secured memory 208 can be outside of the trusted device component 204. In general, the secured memory 208 is effectively secured by the trusted device component 204 where, for example, only the trusted device component 204 can access the secured memory 208 and/or effectively controls access to the secured memory 208. In any case, the trusted device component 204 can be configured and/or be operable to determine one or more current internal integrity values for one or more computing components that are stored in memory 202 and the loading/verification component 206. Those skilled in the art will readily appreciate that the internal integrity values can, for example, be effectively determined (e.g., measured) by using hash values, checksums and/or signatures for various components stored in the memory 202. In general, verification techniques can be used to ensure that the current measured values are consistent with known (or expected) values stored in the secured memory 208. As such, the trusted device component 204 can effectively compare the current internal integrity values to the known internal integrity values 210 in order to determine whether the computing components stored on memory 202 and the loading/verification component 206 have maintained their integrity.

If the trusted device component 204 determines that a computing component or the loading/verification component 206 has not maintained its integrity, it may take remedial action. Remedial actions can, for example, include stopping the boot process, not allowing a computing component to be loaded into a host system, and/or generating errors in an error log. In general, the trusted device component 204 can identify the components that are deemed to be compromised (or have lost their integrity) and take remedial action.

On the other hand, if the trusted device component 204 determines that the components stored in the memory 202 have maintained their integrity, it can effectively initiate the loading/verification component 206. The loading/verification component 206 can ensure that the one or more components are used in a safe and secure environment provided by a trusted host. It should be noted that the loading/verification component 206 can, for example, be initiated automatically as soon as the internal-integrity is verified or when a request or attempt to effectively use a host environment is made (e.g., when the secure device is connected to a host computing system). When the loading/verification component 206 is initiated, it effectively issues an attestation challenge to the host computing system that can effectively provide a host computing environment for the computing components stored in the memory 202. The host computing system can effectively respond to the attestation challenge by providing one or more host integrity values associated with the host and/or the host computing environment. Those skilled in the art will readily appreciate that the host integrity values can, for example, be defined in accordance with the guidelines set forth by the Trusted Computing Group (TCG) community. In general, a trusted platform device can attest to its state (or report its integrity), for example, by reporting values that are stored inside the registers in a TPM chip. The attested host integrity values can be compared to a set of known host integrity values 212. As such, the loading/verification component 206 can effectively compare the attested host integrity values 210 received from a host computing device to the known host-integrity values 212 in order to determine whether the host computing device and/or the computing environment it provides can be trusted to be safe. Referring to FIG. 2A, the known host integrity values 212 are shown to be a part of the secured memory 208 within the trusted device component 204. Therefore, the loading/verification component 206 may have to interface with the trusted device component 204 in order to effectively access and obtain the known host integrity values 212.

If the loading/verification component 206 determines that the host has not successfully attested to its attestation challenge, it does not allow the computing components stored on memory 202 to be loaded into the host computing system. On the other hand, if the loading/verification component 206 determines that the host computing system has successfully attested to its attestation challenge, it can load and/or facilitate the loading of the one or more computing components into the host computing system. By way of example, one or more of the operating systems (OS1 and OS2) can be initially loaded into a host computing environment provided by the host computing system before one or more applications (APP1, APP2 and APP3) are loaded with data (data1, data2 and data3) for execution in the host computing environment. It will be appreciated that the host computing environment can be a secure hosting environment provided by a trusted host as will be described in greater detail below.

Figure 2B:
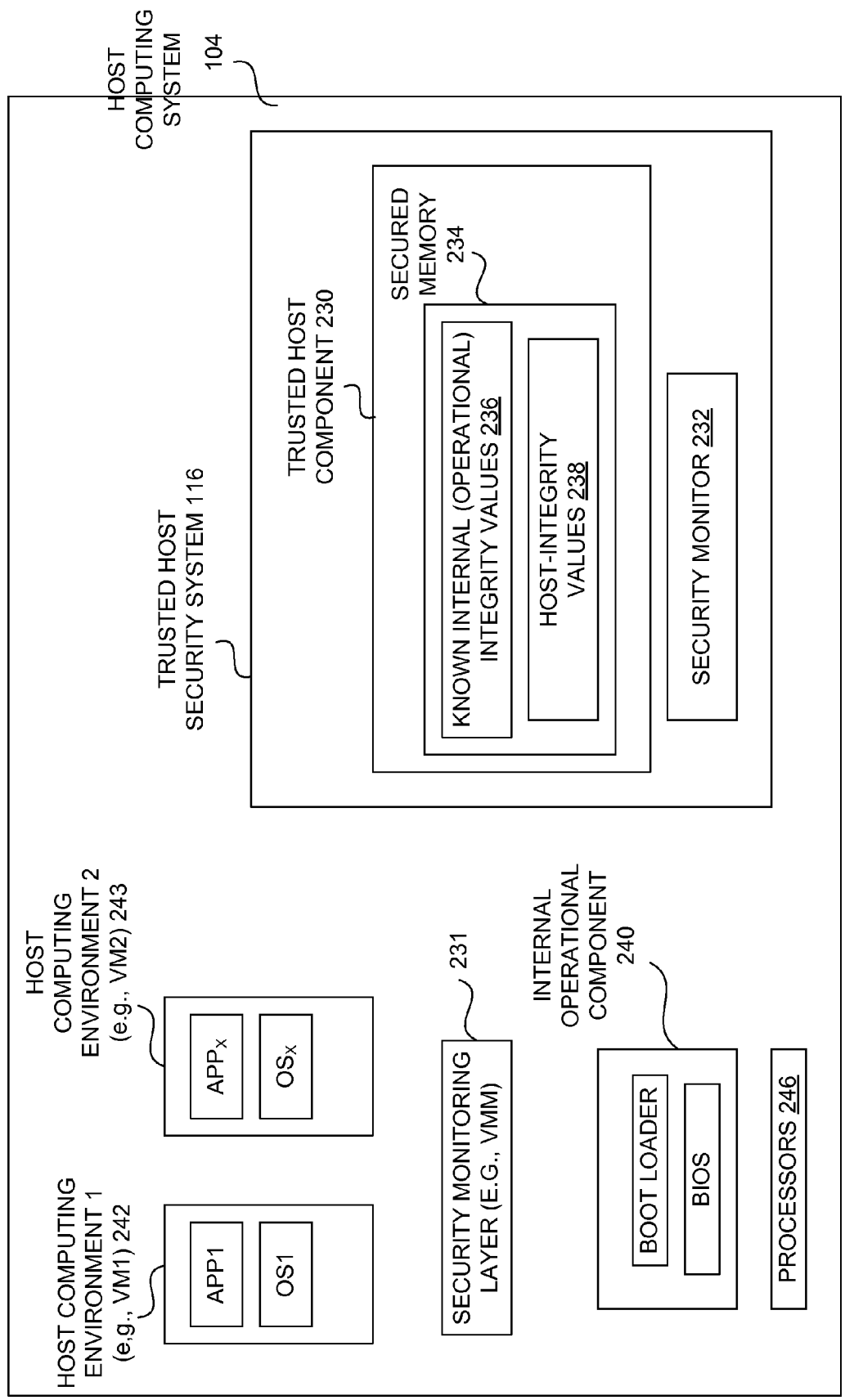
FIG. 2B depicts the host computing system (or device) in accordance with another embodiment of the invention.

FIG. 2B depicts the host computing system (or device) 104 (shown in FIG. 1A) in greater detail accordance with one embodiment of the invention. Referring to FIG. 2B, the host computing system 104 includes one or more processors 246, internal operational components and a trusted host security system 116. Conceptually, the trusted host security system 116 provides a trusted host component 230 and a security monitor 232. The trusted host component 230 effectively includes secured memory 234 storing known internal (or operational) integrity values 236 associated with the internal integrity of the computing system 104. The secured memory 234 also stores host integrity values 238 as values that computing system 104 can attest to in response to an attestation request. It should be noted that the internal (or operational) integrity values 236 and the host integrity values 238 can have one or more common values or even be effectively the same. Similar to the trusted component 114 provided for the secure device 102 depicted in FIG. 2A, the trusted component 230 can, for example, be implemented as a trusted platform module (TPM) component (e.g., a TPM chip) that effectively attest to its integrity values using values stored in its registers.

The trusted host component 230 can perform an internal integrity check of the host computing system 104. The internal integrity check can generally verify the integrity of internal operational components 240 of the host computing system 104. As depicted by FIG. 2B, the internal operational components 240 can, for example, include a boot loader and basic input/output system (BIOS). In general, the integrity of the host computing system 104 can be verified. In particular, the internal operational components that directly or indirectly support a host computing environment 242 can be verified. In order to determine whether the internal operation components 240 have maintained their integrity, the current integrity values for these components can be measured and compared to the known (or expected) internal operational integrity values 236 stored in the security memory 234. It will be appreciated that the trusted host component 230 can, for example, perform the internal integrity check when the host computing system 104 is initially started or booted, periodically, and/or when there is a need to provide the host computing environment 242 for use by an external device. In general, the trusted host component 230 can prevent the use of the host computing environment 242 unless an internal integrity check has been performed successfully. If the internal integrity check fails, remedial action including, for example, shutting down the host computing system 104, isolating one or more computing components, preventing the use of one or more computing components and/or generating an error message can be performed.

On the other hand, if the trusted host component 230 determines that the internal operational components 240 have maintained their integrity, the trusted host component 230 can effectively wait to receive a request for its hosting services. This request can effectively be made by issuing an attestation challenge (or request). As such, the trusted host component 230 can effectively wait for an attestation challenge (or a request for verification of its integrity as a trusted device). The trusted host component 230 can effectively determine whether to honor an attestation request. By way of example, the trusted host component 230 can authenticate a device that requests its services and authorize the use of its services as deemed appropriate. If the attestation challenge is honored, the trusted host component 230 can effectively attest to its integrity by providing one or more host integrity values 238 to the requesting device. Generally, the host integrity values 238 can be made known to a requesting device so that it can determine whether the host computing system can be considered to be a trusted host which can provide a safe (or secure) host computing environment. The host integrity values 238 can, for example, be identifiers assigned to the host computing system 104 and made known to other devices. As another example, the host integrity values 238 may effectively represent a summary of the internal operational components 240 and hardware components. As such, host integrity values 238 allow another party to verify that hardware and software components of the host computing system 104 have not changed.

It should be noted that the trusted host component 230 can take various security measures to further enhance the security of the system. These security measures can, for example, use encryption techniques for encrypting the host integrity values 238 transmitting them in response to an attestation challenge. The host integrity values 238 can, for example, be encrypted using a pair of public and private keys as will be readily appreciated by those skilled in the art. The public key can be managed by a third trusted entity. The private key can be used to effectively sign the integrity values so that the requesting device can subsequently verify the signature of the host computing device 104. As noted above, integrity values can, for example, be measured using various techniques including, for example, measuring hash values, checksums, signatures, etc.

In any case, based on the integrity values 238, the device issuing the attestation challenge can determine whether it can trust the host computing system to provide a safe (or secure) host computing environment. If the host computing system 104 is trusted, it can effectively provide the host computing environment 242 for the device that issued the attestation request. By way of example, one or more computing components stored on the device can be loaded into the host computing environment 242. Referring to FIG. 2B, one or more applications (APP1) and one are more operating systems (OS1) of an external device are loaded and can effectively operate in the host computing environment 242.

It should also be noted that the security monitor 232 can effectively provide a security monitoring layer 231 to insulate the host computing environment 242 from other host computing environments, such as the host computing environment 243 also depicted in FIG. 2B. In addition, the security monitoring layer 231 can effectively isolate the host computing environment 242 from the internal operational components 240. As suggested by FIG. 2B, various computing components can be loaded into the host computing environment 242 in a manner that would allow, for example, for a first application program (APP1) to be executed using a first operating system (OS1) over the internal operational components 240. In other words, the host computing environment 242 can be provided as a virtual computing environment. By way of example, the host computing environment 242 can be provided as a virtual machine that utilizes a native operating system (OS1) stored on an external device (e.g., a memory device). In this way, the host computing environment 242 can effectively allow a complete copy (or image) of an external computing environment to be loaded and executed using one or more processors 246 provided by the host computing system 104. Those skilled in the art will readily appreciate that the security monitor 232 can, for example, be implemented as a virtual machine monitoring layer (or a Virtual Machine Monitor) that, among other things, effectively isolates the host computing environment 242 from the internal operating components 240 as well as other host computing environment(s) 243 that may be provided by the host computing system 104.

It should also be noted that the trusted host component 230 can also check the integrity of the security monitor 232. The integrity of the security monitor 232 can be checked, for example, before the host computing environment 242 is effectively initiated, periodically, and/or during the execution of the application program (APP1). The known integrity values for the security monitor 232 can also stored in the secure memory 234.

The security monitoring layer 231 can effectively protect the run time memory of the host computing environment 242 from a host operating system that is operating on the host computing system 104. Those skilled in the art will further appreciate that policies or rules can be defined and enforced in order to control interactions between the host computing environment 242 (e.g., virtual machine 1) and the internal operational components 240 of the host computing system 104. These rules and policies can be measured and effectively verified by a trusted device component and/or a trusted host component respectively provided for the device requesting a hosted environment and the host computing system that provides the host computing environment.

Figure 2C:
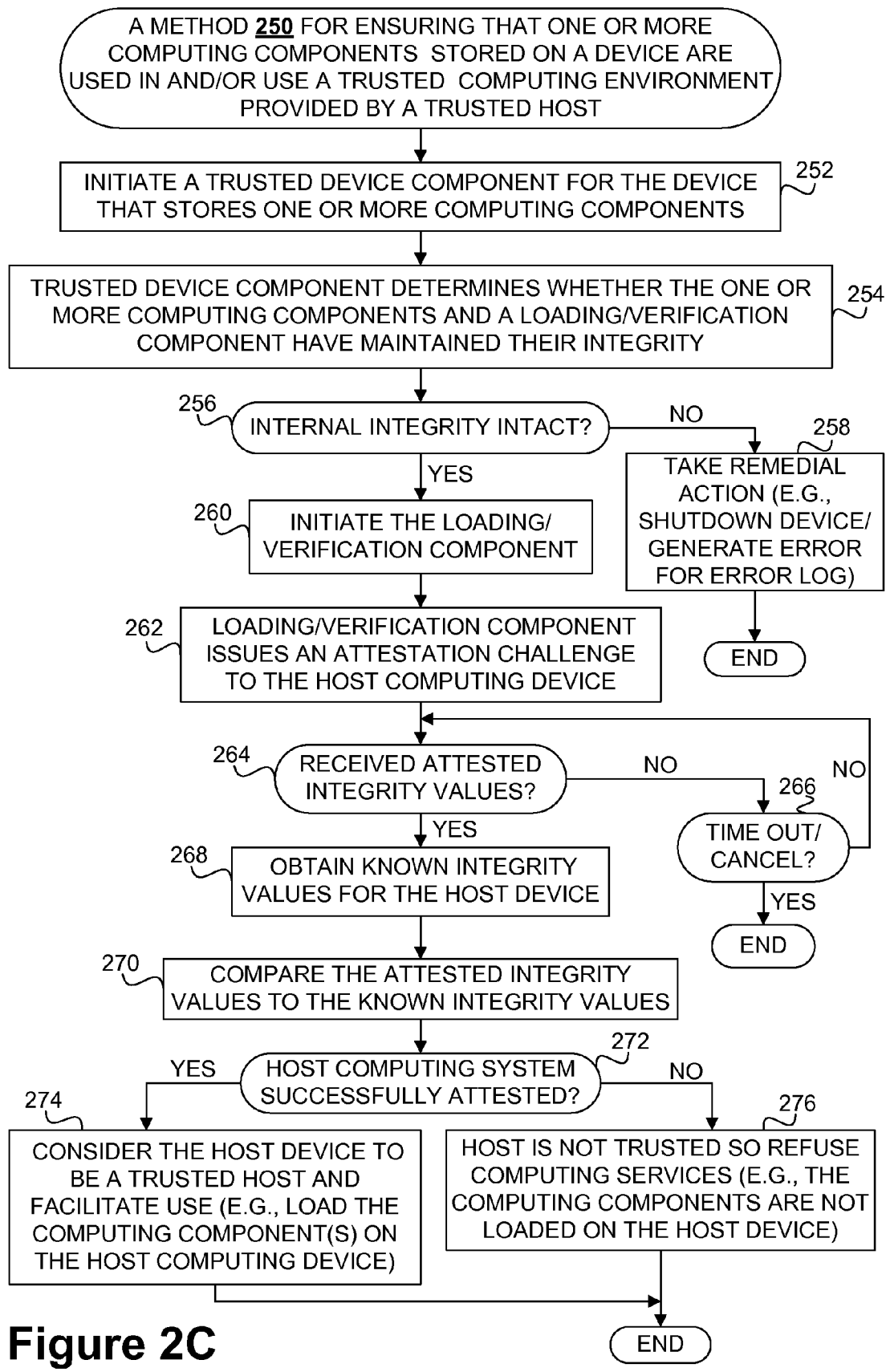
FIG. 2C depicts a method for ensuring that one or more computing components stored on a device are used in a safe computing environment in accordance with another embodiment of the invention.

FIG. 2C depicts a method 250 for ensuring that one or more computing components stored on a device are used in and/or use a trusted (safe or secure) computing environment in accordance with another embodiment of the invention. The computing environment can, for example, be provided by a host computing system (device). The method 250 can, for example, be used by the secure device 102 depicted in FIG. 2A. Referring to FIG. 2C, a trusted device component is initiated (252) for the device. Typically, the device stores one or more computing components that can use and/or be used in a host computing environment provided by a host computing system (or device). However, it will be appreciated that the one or more components can be stored on a different device than the device that effectively provides and/or initiates the trusted device component.

As noted above, the trusted device component can, for example, effectively control the start-up or booting process. By way of example, the trusted device component can be implemented as a Trusted Platform Module (TPM) component or chip. In any case, the trusted device component can effectively ensure that the one or more computing components are used in a trusted computing environment. Initially, the trusted device component can perform an internal integrity check of the device. More particularly, the trusted device component determines (254) whether the one or more computing components and a loading/verification component have maintained their integrity. If the trusted device component determines (254) that either one or the one or more computing components or the loading/verification component has not maintained its integrity, the trusted device component can take remedial action (e.g., effectively shut down the device or generate an error log). However, if the trusted device component determines (256) that the one or more computing components and the loading/verification component have maintained their integrity, it initiates (260) the loading/verification component. It will be appreciated that the loading/verification component can effectively interface with a host to determine whether to trust the host and further facilitate use of the host computing environment by performing various operations including, for example, loading of the one or more computing components into the host computing environment.

Referring back to FIG. 2C, the loading/verification component issues an attestation challenge (request or demand) to the host computing device. In general, the attestation challenge asks the host computing device to report its integrity state or status. In response, the host computing system can report one or more integrity values (attested integrity values). In effect, the loading/verification component can wait (264) to receive the attested integrity values from the host computing device. However, it should be noted that the method 250 can effectively end as a result of a time out and/or cancellation request (266) while the loading/verification component is waiting for a response to the attestation challenge. If it is determined (264) that attested integrity values are received, known integrity values are obtained (268) for the host device. The known integrity values are compared (270) to the integrity values attested by the host computing device. Based on the comparison (270), it is determined whether the host computing system has successfully attested to the attestation challenge. In other words, it is determined (272) whether the host can be trusted as a trusted host that can provide a trusted environment. Accordingly, if it is determined that the host computing system has successfully attested to the attestation challenge, the host device is considered (274) as a trusted host device and the loading/verification component can effectively facilitate the use of the host computing environment (e.g., the loading/verification component can load the one or more computing components on the host computing environment provided by the host computing device). On the other hand, if it is determined (272) that the host computing system has not successfully attested to the attestation challenge, the host is not trusted and the loading/verification component typically does not allow the one or more components to be loaded in the host computing device. However, it will be appreciated that various other actions can be taken. For example, a warning can be issued to let the user decide whether to proceed. More generally, the loading/verification component can determine whether to trust the host or not so that appropriate action can be taken, thereby protecting the one or more computing components stored on the device.

Figure 2D:
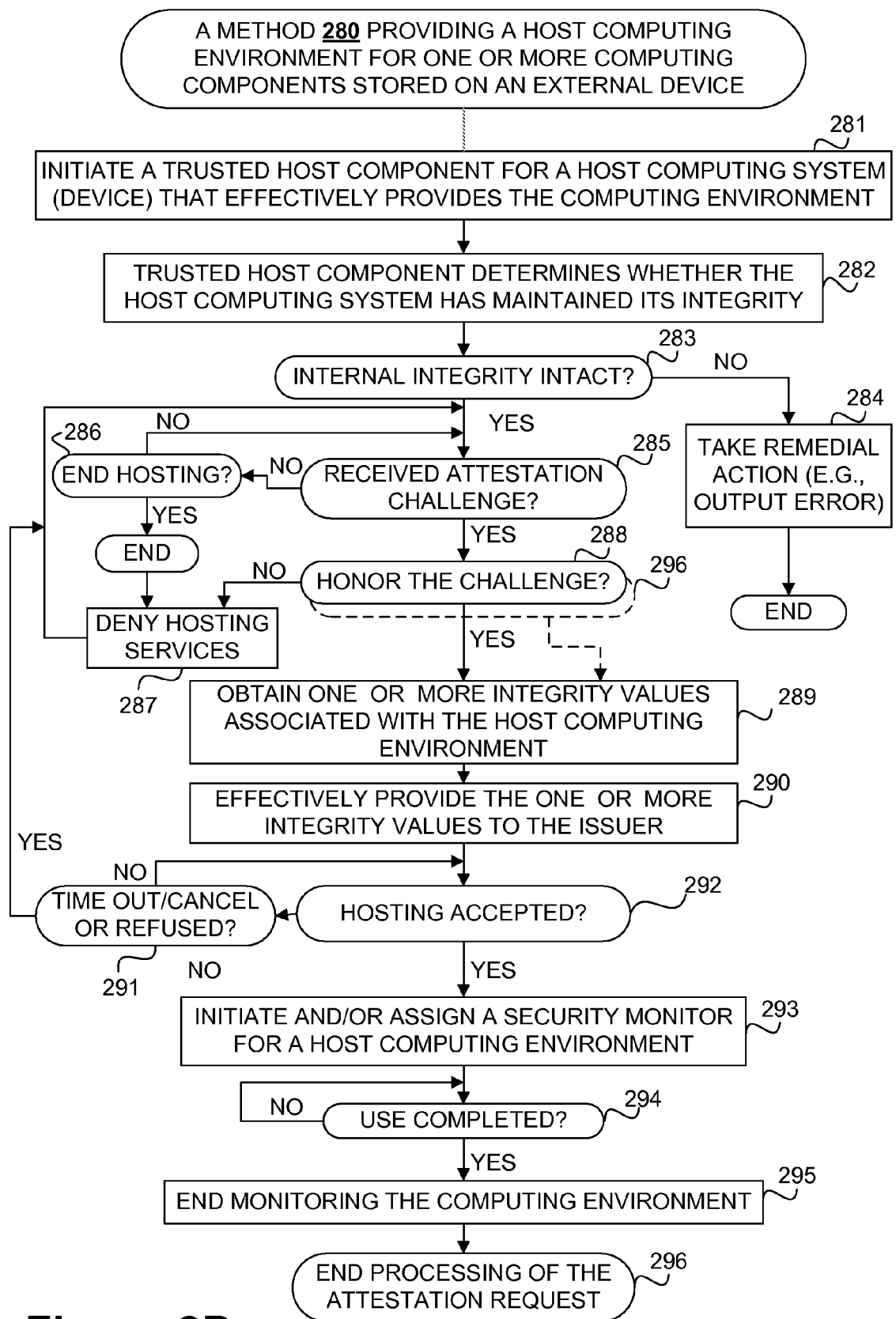
FIG. 2D depicts a method for providing a computing environment for use by one or more computing components in accordance with another embodiment of the invention.

FIG. 2D depicts a method 280 for providing a host (or hosted) computing environment for one or more computing components in accordance with another embodiment of the invention. The computing components can, for example, be stored on an external device that makes a connection to the host computing system (or device) that provides a host computing environment. By way of example, one or more computing components can be stored on a memory device that plugs into a computer acting as a host device that can provide a host computing environment. Initially, a trusted host computing component is initiated (281) for a host computing system (or device) that can effectively provide the computing environment for use by one or more computing components. Similar to the trusted device component described above, the trusted host component can effectively check the internal integrity of the host computing system. The trusted host component can, for example, be the first component that is effectively started when the computing and/or hosting operations of the host computing system are initiated (e.g., when the host computing system is booted). The trusted host component can determine (282) whether the host computing system has maintained the integrity (i.e., whether the internally integrity is intact). By way of example, the trusted host component can determine or measure the internal integrity values of various internal or operational components of the host computing system. Generally, the trusted host component can at least check the integrity of the operating components that effectively support host computing environment for the one or more computing components stored on the external device. Accordingly, it is determined (283) whether that the internal integrity is intact. If it is determined (283) that the internal integrity is not intact, remedial action is taken (284) (e.g., error can be output) and the method 280 ends. However, if it is determined (283) that the internal integrity is intact, the method 280 can effectively wait to receive an attestation challenge (or request) from an external device and/or a requesting device that issues the attestation on behalf of the external device). The method 280 can effectively end if it is determined (286) to end the hosting services while the trusted host component is waiting to receive an attestation challenge. It should be noted that multiple external devices can issue attestation challenges at a given time. Those skilled in the art will readily appreciate that a separate process can be initiated for processing of each one the attestation requests. As such, multiple processors (288 and 296) can be initiated to respectively handle multiple attestation requests.

If it is determined (285) that an attestation challenge has been received, it is determined (288) whether to honor the attestation challenge. This determination (288) can, for example, be made based on authentication and authorization of the external (or requesting) device issuing the attestation challenge. If it is determined (288) not to honor the attestation challenge, hosting services are effectively denied (287) and the method 280 can effectively wait to receive another attestation challenge from another external device in a similar manner as described above. However, if it is determined (288) to honor the attestation challenge, one or more integrity values associated with the host computing system are obtained (289). As noted above, the integrity values can, for example, be host integrity values of a host computing system that effectively report its integrity state. The one or more host integrity values are effectively provided (290) to the external and/or requesting device). As noted above, the integrity value(s) can be provided in a secure manner, for example, by encrypting the values before transmitting them to the external and/or requesting) device. The requesting device can effectively compare the integrity values attested by the trusted host component to those that are known to be indicative of a trusted host. In general, the integrity values are effectively provided (290) to the issuer of the attestation challenge which can effectively indicate that it trusts the host computing environment (e.g., a device issuing an attestation challenge can send an acknowledgement to the host computing device that successfully attested to its integrity). It should be noted that a time out, cancellation and/or refusal to accept the host computing environment as a trusted computing environment can effectively end the waiting (292) for an acceptance. In such case, the method 280 can effectively wait end processing a particular attestation challenge and wait (285) to receive another attestation challenge. On the other hand, if it is determined (292) that the host computing environment has been accepted as a trusted computing environment, a security monitor is initiated and/or assigned (293) to a host computing environment provided for the one or more computing components stored on the external device. It will be appreciated that the security monitor can effectively monitor the multiple host computing environments provided for multiple external devices. This monitoring of the host computing environment(s) can continue to until it is determined (294) to the host computing environment. If it is determined (293) that the use of the computing environment has ended. When the use of a host computing environment ends, the monitoring of the host computing environment also ends (295) to effectively end the processing of an attestation challenge. However, it should be noted that processing of other attestation challenges (296) can still continue. Although not depicted in FIG. 2D, It should be noted that the integrity of the security monitor can be checked prior to initiation of the host computing system and/or during the use of the host computing environment. The method 280 ends when it is determined (286) to end the hosting services provided by the host computing device.

Figure 3:
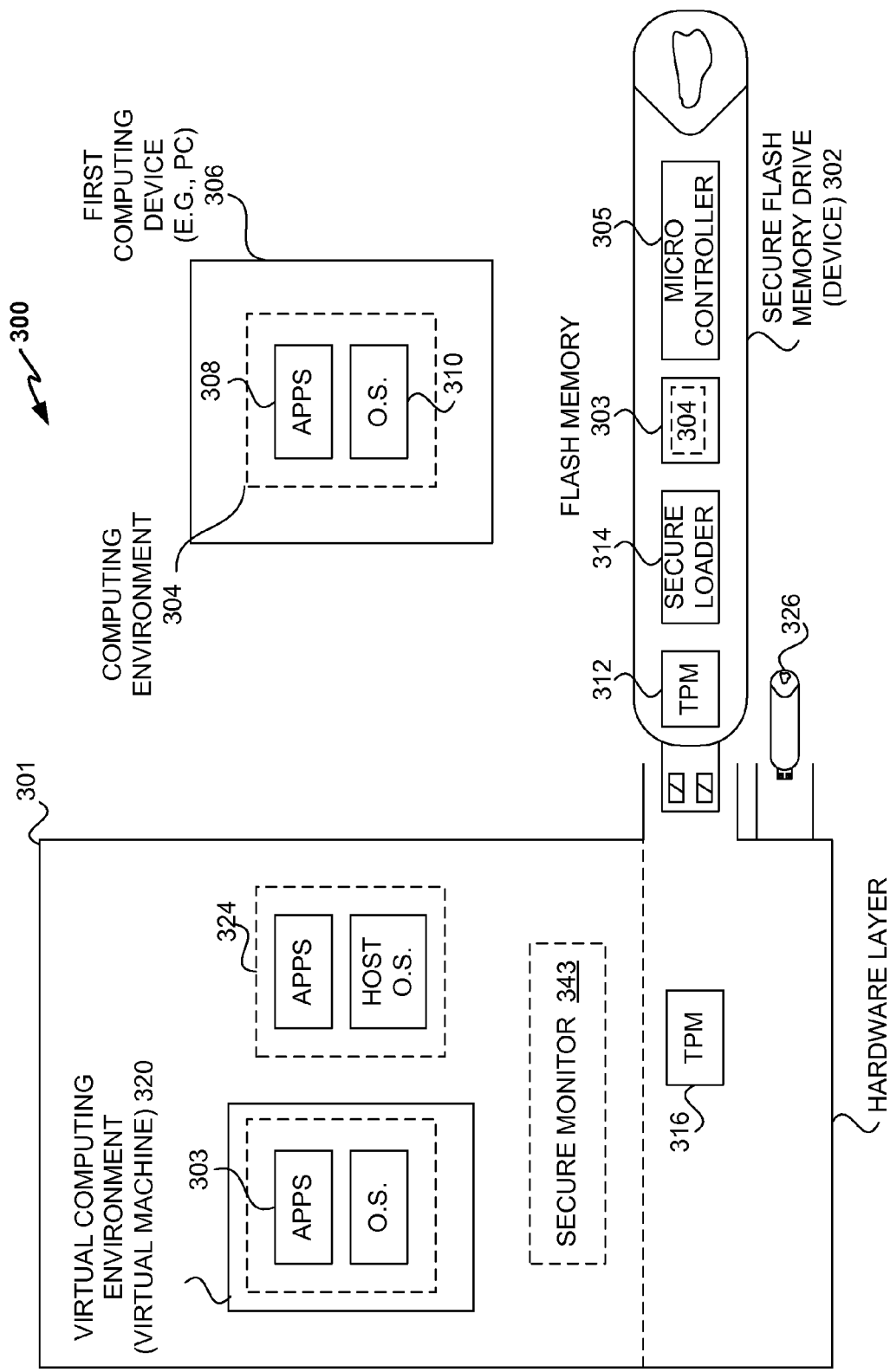
FIG. 3 depicts a computing environment in accordance with another embodiment of the invention.

FIG. 3 depicts a computing environment 300 in accordance with another embodiment of the invention. Referring to FIG. 3, a secure flash memory drive (or device) 302 provides flash memory 303 for storing content. It will be appreciated that flash memory drive 303 can effectively store a complete computing environment 304 stored and on a first computing device (e.g., a Personal Computer) 306. In other words, a complete copy (image) of a computing environment sufficient to run executable computer program code including one or more applications 308 and one or more operating systems 310 can be stored in the flash memory 303. Those skilled in the art will appreciate that the secure flash memory drive 302 can, for example, be implemented as a USB flash drive that can be easily connected to (or plugged into) various computing devices configured with one or more USB ports. Also, the secure flash memory device 302 can provide sufficient memory to allow a user to effectively copy all the content stored in the first computing device 306 including a complete computing environment 304 and store it in the secure flash memory device 302. Moreover, it will be appreciated that the secure flash memory drive 302 can secure the content to ensure that a trusted host computing environment trusted to provide a safe computing environment is provided for the content. Referring to FIG. 3, a host computing environment can be provided by the host computing system (or device) 301 when the secure memory drive 302 is operatively connected to the host computing system 301.

Similar to conventional flash memory drives, a microcontroller 305 can be provided for the secure flash memory device 302. The microcontroller can, for example, include a relatively small RISC microprocessor. The flash memory 303 can, for example, be implemented as a flash memory chip for storing content in a binary format. In order to secure the content and ensure that the content is effectively loaded and used in a trusted computing environment, the secured flash memory 302 effectively provides a Trusted Platform Module (TPM) component 312 and a secure loader 314. More particularly, the TPM 312 is initiated when the secure flash memory drive 302 is first connected to the host computing system 301. In other words, the TPM 312 is the first component that is initiated as soon as the secure memory drive 302 is powered on or receives power and therefore can effectively control the booting process of the secure flash memory drive 302. The TPM 312 determines whether the computing environment 302 stored on the flash memory 303 and the secure loader 314 have maintained their integrity. In other words, the PTM 312 can perform an internal integrity of the secure flash memory drive 302 before allowing the content to be loaded onto the secure host computing system 310. Again, it should be noted that various techniques can be used to measure and verify the internal integrity of various components of the secure flash memory device 302. By way of example, the TPM 312 can determine the internal hash functions for the secure loader 314 as well as the various computing components of the computing environment 304 stored on the flash memory device 303. These values (internal integrity values) can be compared with the known (or expected) integrity values that are stored in the secure memory (not shown) provided by the TPM 312 which can, for example, be implemented as a hardware chip. If the TPM 312 determines that the internal integrity of the secure flash memory device 302 has not been maintained, the booting operation of the secure flash memory drive 302 can be effectively stopped by the TPM 312, rendering the flash memory device 303 in essence inoperable and inaccessible to the host computing system 301. As a result, content data stored in the flash memory 303 cannot be loaded into the host computing system 301, thereby effectively protecting the host computing system 301 from content that may have compromised and/or defective operational code and components of the secure flash memory drive 302.

On the other hand, if the TPM 312 determines that the internal integrity of the secure loader 314 and the computing environment 304 have been maintained, it initiates the secure loader 314. If initiated, the secure loader 314 issues an attestation challenge to the host computing system 301. It should be noted the host computing system 301 is depicted as a trusted (or secure) host that provides a host TPM component 316 in accordance with one embodiment of the invention. As such, in response to the attestation challenge issued by the secure loader 314, the host TPM component 316 generates an attestation report (or response).

Generally, the host TPM 316 can behave in a similar manner as described above. More particularly, the TPM 316 can access the host integrity values from its secure memory and subsequently generate an attestation report. The host integrity values can, for example, provide a summary of the various software and hardware components of the host computing system 301, thereby allowing the loading 314 to verify that that host computing system 301 has not deviated from an integrity state known or agreed to be a trusted or safe state. The communication between the host TPM 316 and secure loader 314 can be secured. More particularly, the host TPM 316 can encrypt the attestation report using a public key assigned to the secured host computing system 310. In addition, a private key can be used to effectively sign the host integrity values before they are provided to the secure loader 314. The secured loader 314 can, for example, verify the public key of the secure host computing system 310, the signature of the host computing system 310 and the host integrity values by decrypting them using a pair of public and private keys. It should also be noted that the host TPM 316 can perform an internal integrity check of the host computing system 301 before attesting to the integrity of the computing system 301. The internal integrity can, for example, be checked when the host computing system 301 is initially started, before an attestation report is made, periodically. As such, the host TPM 316 can be configured to effectively stop the booting process if the internal integrity cannot be verified and/or stop the hosting or general operations of the host computing system 301.

Generally, the secure loader 314 can effectively determine whether the host computing system 310 has successfully attested to the attestation challenge as a trusted host. If the secure loader 314 determines that the secure host computing system 310 has not successfully attested to its attestation challenge, the secure loader 314 does not allow the computing environment 304 to be loaded to the host computing system 301. The secure loader 314 can effectively terminate the booting process rendering the flash memory 303 inaccessible.

However, if the secure loader 314 determines that the secure host computing system 310 has successfully attested to its integrity, the secure loader 314 can load the content stored on memory 303 into the host computing environment 320 provided by the host computing system 310. More particularly, the one or more computing components including application(s) 308 and operating system(s) 310 can be loaded into a host virtual computing environment (e.g., a virtual machine) 320 effectively created by host computing system 301. It will be appreciated that the host virtual computing environment allows executing the application(s) 308 using the same operating system(s) 310 of the first computing device 306. Typically, the operating system(s) 310 is loaded before the application(s) 308 and/or data.

It will also be appreciated that a secure monitor or monitoring layer (e.g., Virtual Machine Monitor (VMM)) 343 can be effectively initiated for the host computing system 301 to ensure that the virtual computing environment 320 is isolated from other virtual computing environment(s) 324 also provided by the secure host computing system 310. The host TPM 316 can ensure the security of the monitoring layer 343 by verifying its internal integrity. It should be noted that one or more other virtual computing environments (e.g., virtual machines) 324 can be effectively provided for one or more other secure flash memory devices 326 connected to the host computing system 301. The host TPM 316 can respond to the attestation requests received from the secure flash memory devices 326 device(s) in a similar manner as noted above.

Those skilled in the art will appreciate that a Virtual Machine Monitor (VMM) can be a virtualized platform that allows multiple operating systems to run on a host computing system at the same time. Virtual Machine Monitors (or hypervisors) include type I and type II VMMs. Type I VMM can be implemented as software that runs directly on a given hardware platform. A type II VMM can run within a host operating system environment. As such, it is desirable to measure and verify the integrity of the host operating system for a type II VMM. It should also be noted that it is not necessary to implement a VMM for a host computing system. However, this could mean having to boot the operating system from and external device and not being able to run additional operating systems on the host machine.

Trusted Computing (commonly abbreviated TC) is a technology developed and promoted by the Trusted Computing Group (TCG). In Trusted Computing, a "trusted" computer is trusted to behave in specific ways, and those behaviors are believed to be enforced by hardware and/or software. A Trusted Platform Module (TPM) can refer to the name of a published specification detailing a microcontroller that can store secured information, as well as the general name of implementations of that specification, often called "TPM chip" or "TPM Security Device." The TPM specification is the work of the Trusted Computing Group (TCG). The TPM published specifications are hereby incorporated by reference herein for all purposes.

Those skilled in the art will further appreciate that a Trusted Platform Module (TPM) can offers facilities for secure generation of cryptographic keys, the ability to limit the use of keys (to either signing/verification or encryption/decryption), as well as a Hardware Random Number Generator. It also includes capabilities such as remote attestation, binding and sealed storage. Remote attestation can create a summary of the hardware, boot, and host O/S configuration of a computer, allowing a third party to verify that the software and hardware has not been changed. Sealing encrypts data in such a way that it may be decrypted only in the exact same state (that is, it may be decrypted only on the computer it was encrypted running the same software). Binding encrypts data using the TPM's endorsement key (a unique RSA key put in the chip during its production) or another "trusted" key. A Trusted Platform Module can be used to authenticate a hardware device. Since each TPM chip is unique to a particular device, it is capable of performing platform authentication. For example, it can be used to verify that the system seeking the access is the expected system.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A nonvolatile memory device for securing content stored therein and for ensuring that a computing environment provided by a host computing system is a trusted computing environment safe for said stored content when said nonvolatile memory device is connected to said host computing system, wherein said nonvolatile memory device comprises:

nonvolatile memory capable of storing one or more computing components;

a Trusted Platform Module component for verifying internal integrity of said nonvolatile memory device; and a loading and verification component for ensuring that a trusted computing environment is provided for said stored content;

wherein said Trusted Platform Module component is configured to:

determine whether said nonvolatile memory device has maintained said internal integrity;

initiate said loading and verification component when said nonvolatile memory device has maintained said internal integrity; and prevent initiation of said loading and verification component when said nonvolatile memory device has not maintained said internal integrity;

wherein said loading and verification component when initiated is configured to:

issue an attestation challenge to said host computing system regarding the integrity of said host computing system;

in response to said attestation challenge, receive one or more attested host integrity values for said host computing system;

obtain one or more known host integrity values for said host computing system from said nonvolatile memory;

determine whether said host computing system is a trusted host that can provide a trusted computing environment for said one or more computing components by comparing said one or more attested host integrity values to said one or more known host integrity values;

allow said host computing system to provide a host computing environment for said one or more computing components when said host computing system is a trusted host by loading and/or facilitate loading of said one or more computing components on said host computing environment; and prevent said host computing system from providing a host computing environment for said one or more computing components when said host computing system is not a trusted host by preventing loading of said one or more computing components on said host computing environment, thereby preventing said one or more computing components from using or being used in said host computing environment.

2. The nonvolatile memory device of claim 1, wherein said determining whether said nonvolatile memory device has maintained said internal integrity comprises:
determining one or more current internal integrity values for at least said one or more computing components and said loading and verification component;
retrieving from said nonvolatile memory known internal integrity values for at least said one or more computing components and said loading and verification component;
comparing at least said one or more current internal integrity values and said known internal integrity values; and
determining, based on said comparing, whether at least said one or more computing components and said loading and verification component have maintained said internal integrity before allowing said one or more computing components to be loaded into said host computing system.

3. The nonvolatile memory device of claim 2, wherein said Trusted Platform Module component retrieves said known internal integrity values from secure memory secured by said Trusted Platform Module component.

4. The nonvolatile memory device of claim 1, wherein said nonvolatile memory includes flash memory.

5. The nonvolatile memory device of claim 3, wherein said nonvolatile memory device includes a USB flash drive.

6. The nonvolatile memory device of claim 1, wherein connecting said nonvolatile memory device to said host computing system initiates said Trusted Platform Module component, thereby allowing said Trusted Platform Module component to control a startup process for said nonvolatile memory device.

7. The nonvolatile memory device of claim 1, wherein said Trusted Platform Module component and/or said loading and verification component are configured and/or operable to shutdown said nonvolatile memory device, thereby rendering said nonvolatile memory device inoperable and/or inaccessible to said host computing system.

8. The nonvolatile memory device of claim 1, wherein said Trusted Platform Module component is implemented as a hardware component and/or a chip in compliance with a Trusted Platform Module specification.

9. The nonvolatile memory device of claim 1, wherein said Trusted Platform Module component is the first component to start when said nonvolatile memory device is powered up and/or boots, thereby allowing said Trusted Platform Module component to control the powering up and/or booting process for said nonvolatile memory device.

10. The nonvolatile memory device of claim 1, wherein said one or more computing components include one or more of the following:
data, an executable computer program, an operating system, an application program, computer program source, files, text files, audio files, video files, and audio-visual files.

11. The nonvolatile memory device of claim 1, wherein said loading and verification component when initiated is further configured to:
decrypt and/or encrypt said one or more attested host integrity values and/or said one or more known internal integrity values using a set of public and private keys.

12. The nonvolatile memory device of claim 1, wherein said loading and verification component is further configured to: authenticate said nonvolatile memory device for said host computing system.

13. The nonvolatile memory device of claim 1, wherein said loading and verification component is further configured to:
load and/or facilitate loading of one or more operating systems stored on said nonvolatile memory device in said host computing system when said loading and verification component determines to trust said host computing system as a trusted host; and
load and/or facilitate loading of one or more application programs stored on said nonvolatile memory device on said host computing system after said loading of said one or more operating systems, wherein said one or more application programs can be executed using said one or more operating systems.

14. The nonvolatile memory device of claim 13, wherein said loading of said one or more operating systems loads a complete image of an operating system on a host virtual environment or host virtual machine provided by said host computing system.

15. The nonvolatile memory device of claim 13, wherein said host computing environment includes a host virtual machine provided for execution of computer program code stored on said nonvolatile memory device.

16. The nonvolatile memory device of claim 11, wherein said one or more computing components include at least one operating system and at least one application program that collectively represent a copy or image of a second computing environment associated with a second computing device.

17. The nonvolatile memory device of claim 2, wherein said internal integrity values comprise one or more of the following: hash code values, signatures, and checksums.

18. A computing system for providing a trusted computing environment for one or more computing components stored on a connectable nonvolatile memory device when said nonvolatile memory device is coupled to said computing system to protect said nonvolatile memory device, wherein said computing system comprises:
one or more processors capable of executing executable computer program code;
memory capable of storing said computer program code;
a Trusted Platform Module component for ensuring that a trusted host computing environment is provided for said one or more computing components stored on said nonvolatile memory device; and
a security monitor for monitoring said trusted host computing environment;
wherein said Trusted Platform Module component is configured to:
verify internal integrity of said computing system;
attest to integrity of said computing system to said nonvolatile memory device when said internal integrity of said computing system is successfully verified;
prevent a host computing environment from being provided for said one or more computing components when said internal integrity of said computing system is not successfully verified;
allow a host computing environment to be provided for said one or more computing components when said internal integrity of said computing system is not successfully verified; and
initiate and/or assign said security monitor to monitor said host computing environment when said host computing environment is provided for said one or more computing components;
wherein said attest to said integrity of said computing system comprises:
obtaining from secure memory one or more host integrity values for said computing system; and
providing said one or more host integrity values to said nonvolatile memory device; and
wherein said nonvolatile memory device is configured to:
determine whether said computing system is a trusted host that can provide a trusted computing environment for said one or more computing components by comparing said one or more host integrity values to one or more known host integrity values;
load and/or facilitate loading of said one or more computing components on said host computing environment when said computing system is a trusted host; and
prevent loading of said one or more computing components on said host computing environment when said computing system is not a trusted host, thereby preventing said one or more computing components from using or being used in said host computing environment.

19. The computing system of claim 18, wherein said verifying of said internal integrity of said computing system comprises:
obtaining one or more current operational integrity values for one or more operational computing components of said host computing system;
obtaining one or more known operational integrity values for said one or more operational computing components of said host computing system;
comparing said one or more current operational integrity values to said one or more known operational integrity values;
determining, based on said comparing, whether said one or more operational computing components have maintained their integrity; and
preventing said computing system from providing a host computing environment when said determining determines that said one or more operational computing components have not maintained their integrity.

20. The computing system of claim 19, wherein said Trusted Platform Module component is further configured and/or operable to encrypt said one or more host integrity values using a pair of public and private keys as encrypted host integrity values that are provided to said nonvolatile memory device.

21. The computing system of claim 19, wherein said one or more operational computing components of said computing system include one or more of the following:
boot loader, and
Basic Input Output (BIOS).

22. The computing system of claim 18, wherein said Trusted Platform Module component shutdowns said computing system and/or hosting operations of said computing system when said verifying does not successfully verify the internal integrity of said computing system.

23. The computing system of claim 18, wherein said host computing environment includes a virtual hosting environment or a virtual machine provided to support the execution of said one or more computing components on said computing system.

24. The computing system of claim 22, wherein said security monitor includes a Virtual Machine Monitor (VMM) monitoring a virtual hosting environment or virtual machine provided to interface with an operating system stored on said nonvolatile memory device to allow one or more application programs that are also stored on said nonvolatile memory device to be executed using said one or more processors of said host computing system.

25. The computing device of claim 18, wherein said Trusted Platform Module component is further configured to check the integrity of said security monitor before allowing said one or more computing components to be loaded on said computing device.

26. The computing device of claim 18, wherein said Trusted Platform Module component is further configured and/or operable to check the integrity of said security monitor when said one or more computing components have been loaded and/or being executed on said computing device.

27. A computer-implemented method for ensuring that one or more computing components stored on a first device including a trusted device component and a nonvolatile memory are used in a trusted host computing environment provided by a host computing system in response to said first device being connected to said host computing system, said method comprising:
requiring said host computing system to attest to integrity of a host computing environment to the first device before allowing said one or more computing components to use and/or be used in said host computing environment;
determining whether said host computing system has successfully attested to said integrity of said host computing environment; and
allowing said one or more computing components to use and/or be used in said host computing environment when said host computing system has successfully attested to said integrity of said host computing environment;
wherein requiring said host computing system to attest to said integrity of said host computing environment comprises:
obtaining from secure memory one or more host integrity values for said host computing system; and
providing said one or more host integrity values to said first device; and
wherein said first device is configured to:
determine whether said host computing system is a trusted host that can provide a trusted computing environment for said one or more computing components by comparing said one or more host integrity values to one or more known host integrity values;
load and/or facilitate loading of said one or more computing components on said host computing environment when said host computing system is a trusted host; and
prevent loading of said one or more computing components on said host computing environment when said host computing system is not a trusted host, thereby preventing said one or more computing components from using or being used said host computing environment.

28. The method of claim 27, further comprising:
determining whether said one or more computing components stored on said first device have maintained their integrity before allowing said one or more computing components to use or be used in said host computing environment; and
preventing said one or more computing components stored on said first device to use or be used in said host computing environment when said determining determines that said computing device has not successfully attested to integrity of said host computing environment.

29. The method of claim 27, wherein said first device is a storage device provided primarily for storing content.

30. The method of claim 29, wherein said first device is a Flash Memory drive.

31. The method of claim 27, wherein said one or more computing components include one or more of the following:
    data, an executable computer program, an operating system, an application program, computer program source, files, text files, audio files, video files, audio-visual files.

32. The method of claim 27, wherein said one or more computing components include one or more operating systems and one or more application programs which represent an image and/or copy of content stored on a second computing device.

33. The method of claim 32, wherein said one or more computing components include a complete image and/or copy of all content stored on said second device.

34. The method of claim 27, wherein said host computing system provides one or more computing services including one or more of the following:
    processing services for executing one or more computer program, storage services for storing said one or more computing components, application program and/or library services for use in connection with said one or more components.

35. The method of claim 28, wherein said determining of whether said one or more computing components have maintained their integrity further comprises:
    initiating a trusted device component for said first device;
    determining by said trusted device component whether said one or more computing components and a loading and verification component of said first device has maintained said integrity;
    initiating said loading and verification component when said trusted device component determines that said one or more computing components and said loading and verification component have maintained said integrity;
    issuing by said loading and verification component an attestation challenge to said host computing system regarding the integrity of said host and/or said host computing environment;
    receiving by said loading and verification component host integrity data in response to said attestation challenge;
    determining by said loading and verification component based on said host integrity data whether said host computing system has successfully attested to integrity of said host computing system and/or host computing environment;
    allowing said one or more computing components to be loaded into said host computing environment when said loading and verification component determines that said host computing system has successfully attested to integrity of said host computing system and/or host computing environment; and
    preventing said one or more computing components to be loaded to said host computing environment when said loading and verification component determines that said host computing system has not successfully attested to integrity of said host computing system and/or host computing environment.

36. The method of claim 35, wherein said trusted device component includes a Trusted Protocol Module chip implemented as a hardware chip.

37. The method of claim 35, wherein said trusted device component is further configured and/or operable to:
    store integrity values for said one or more computing components and/or loading and verification component in a secure location;
    retrieve said integrity values from said secure location; and
    determine based on said integrity values stored in said secure location whether said one or more computing components and/or loading and verification component have maintained said integrity.

38. The method of claim 37, wherein said trusted device component is implemented as and/or includes a Trusted Platform Module component.

39. The method of claim 38, wherein said Trusted Platform Module component is configured and/or operable:
    determine current values for said one or more computing components and/or loading and verification component;
    compare said current values with said integrity values stored in said secure location; and
    determine based on said comparison whether said one or more computing components and/or loading and verification component have maintained said integrity.

40. The method of claim 39, wherein said secure memory is a memory segment within said trusted device component and/or said secure memory can be accessed only by said trusted device component.

41. The method of claim 27, wherein said determining whether said host computing system has successfully attested to said integrity of said host computing environment comprises:
    receiving at least one attested host integrity value associated with said host computing system and/or said host computing environment;
    obtaining at least one known integrity value associated with said host computing system and/or said host computing environment; and
    comparing said at least one known integrity value to said least one attested host integrity value to determine whether said host computing system has successfully attested to said integrity of said host computing system and/or said host computing environment.

42. The method of claim 41, wherein said at least one attested host integrity value and/or known host integrity value includes an integrity value for one or more of the following:
    boot loader, and
    Basic Input Output Services (BIOS).

43. The method of claim 41, wherein said at least one attested host integrity value is encrypted and said loading and verification component is operable and/or configured to decrypt said at least one attested host integrity value.

44. The method of claim 41, wherein said loading and verification component is operable and/or configured to decrypt said at least one encrypted host attested integrity value using a set of public and private keys, wherein at least said private key is stored in secured memory secured by said trusted device component provided for said first device.

45. A non-transitory computer readable storage medium including computer program code for ensuring that one or more computing components stored on a first device having a nonvolatile memory are used in a safe host computing environment provided by a host computing system, said computer program code comprising:
    computer program code for requiring said host computing system to attest to integrity of said host computing environment to said first device before allowing said one or more computing components to use and/or be used in said host computing environment;
    computer program code for determining whether said host computing system has successfully attested to said integrity of said host computing environment; and
    computer program code for allowing said one or more computing components to use and/or be used in said host computing environment when said host computing system has successfully attested to said integrity of said host computing environment;

wherein requiring said host computing system to attest to said integrity of said host computing environment comprises:

obtaining from secure memory one or more host integrity values for said host computing system; and providing said one or more host integrity values to said first device; and wherein said first device is configured to:

determine whether said host computing system is a trusted host that can provide a trusted computing environment for said one or more computing components by comparing said one or more host integrity values to one or more known host integrity values;

load and/or facilitate loading of said one or more computing components on said host computing environment when said host computing system is a trusted host; and prevent loading of said one or more computing components on said host computing environment when said host computing system is not a trusted host, thereby preventing said one or more computing components from using or being used in said host computing environment.

46. A device for securing content stored therein for trusted computing systems trusted to provide a safe host computing environment for said content, wherein said device comprises:

nonvolatile memory capable of storing content; and a trusted device security system configured to:

require a host computing system after the device is connected to the host computing system to attest to its integrity to the device before allowing said content stored on said device to be accessed by said host computing system and/or be provided to said host computing system;

determine whether said host computing system has successfully attested to its integrity; and allow said content to be accessed by said host computing system and/or provided to said host computing system only when said host computing system has successfully attested to its integrity;

wherein requiring said host computing system to attest to its integrity comprises:

obtaining from secure memory one or more host integrity values for said host computing system; and providing said one or more host integrity values to the device; and wherein the device is configured to:

determine whether said host computing system is a trusted host that can provide a trusted computing environment for said one or more computing components by comparing said one or more host integrity values to one or more known host integrity values;

load and/or facilitate loading of said one or more computing components on a host computing environment provided by said host computing system when said host computing system is a trusted host; and prevent loading of said one or more computing components on a host computing environment provided by said host computing system when said host computing system is not a trusted host, thereby preventing said one or more computing components from using or being used in said host computing environment.

47. A computer-implemented method in a host computing system of providing a trusted computing environment for content stored on a device having a nonvolatile memory, said method comprising:

receiving from said device an attestation challenge to integrity of said host computing system that can provide a host computing environment for said content;

attesting to said integrity of said host computing environment in response to said attestation challenge from said device, thereby allowing said device to determine and indicate whether it trusts said host computing system as a trusted host that can provide a trusted host computing environment trusted to be safe for said content stored on said device; and providing said host computing environment for said content stored on said device when said device indicates that it trusts said computing system as a trusted host;

whereby said device is protected;

wherein attesting to said integrity of said host computing environment comprises:

obtaining from secure memory one or more host integrity values for said host computing system; and providing said one or more host integrity values to said device; and wherein said device is configured to:

determine whether said host computing system is a trusted host that can provide a trusted computing environment for said one or more computing components by comparing said one or more host integrity values to one or more known host integrity values;

load and/or facilitate loading of said one or more computing components on said host computing environment when said host computing system is a trusted host; and prevent loading of said one or more computing components on said host computing environment when said host computing system is not a trusted host, thereby preventing said one or more computing components from using or being used in said host computing environment.

48. The computer-implemented method of claim 47, wherein said method further comprises:

initiating a trusted host component for said host computing system;

determining by said trusted host component whether said host computing system has maintained said integrity;

obtaining one more integrity values associated with said host computing system to be provided to said device in response to said attestation challenge from said device; and initiating and/or assigning a security monitoring component for said computing environment to isolate said host computing environment from other host computing environments and/or internal operational components of said host computing system.

49. A computing system for providing a trusted host computing environment trusted to be safe for content stored on an external device having a nonvolatile memory, wherein said computing system comprises:

a trusted host security system;

receive from said external device a request to attest to integrity of said computing system as a trusted host that can provide a trusted computing environment trusted to be safe for content stored on said external device;

attest to said integrity of said computing system to said external device in response to said request from said external device, thereby allowing said external device to determine and indicate whether it trusts said host computing system as a trusted host; and provide said host computing environment for said content stored on said external device when said external device indicates that it trusts said computing system as a trusted host;

wherein attesting to said integrity of said computing system comprises:

obtaining from secure memory one or more host integrity values for said computing system; and providing said one or more host integrity values to said external device; and wherein said external device is configured to:

determine whether said computing system is a trusted host that can provide a trusted computing environment for said one or more computing components by comparing said one or more host integrity values to one or more known host integrity values;

load and/or facilitate loading of said one or more computing components on said host computing environment when said computing system is a trusted host; and prevent loading of said one or more computing components on said host computing environment when said computing system is not a trusted host, thereby preventing said one or more computing components from using or being used in said host computing environment.

* * * * *